United States Patent [19]
Young

[11] Patent Number: 5,976,045
[45] Date of Patent: Nov. 2, 1999

[54] RANDOM ENGAGEMENT ROLLER CHAIN SPROCKET HAVING IMPROVED NOISE CHARACTERISTICS

[75] Inventor: James D. Young, Chesaning, Mich.

[73] Assignee: Cloyes Gear and Products, Inc., Mentor, Ohio

[21] Appl. No.: 08/900,661

[22] Filed: Jul. 25, 1997

Related U.S. Application Data

[60] Provisional application No. 60/022,321, Jul. 25, 1996, and provisional application No. 60/032,379, Dec. 19, 1996.

[51] Int. Cl.$^6$ .............................. F16H 55/30; F16H 7/02; F16H 55/12
[52] U.S. Cl. ........................... 474/160; 474/153; 474/152
[58] Field of Search .................................. 474/152, 154, 474/156, 157, 158, 160, 202, 203, 204, 205, 153, 159; 74/243 R, 229, 462, 465

[56] References Cited

U.S. PATENT DOCUMENTS

| | | |
|---|---|---|
| Re. 30,018 | 6/1979 | Clemens et al. . |
| 320,734 | 6/1885 | Whiteley . |
| 536,813 | 4/1895 | MacPhail et al. . |
| 698,991 | 4/1902 | Morse . |
| 717,976 | 1/1903 | Dodge . |
| 984,509 | 2/1911 | Crowder . |
| 1,630,313 | 5/1927 | Rorabeck . |
| 1,808,369 | 6/1931 | Munroe . |
| 2,382,740 | 8/1945 | Noffsinger . |
| 2,934,200 | 4/1960 | Fletcher et al. . |
| 3,130,791 | 4/1964 | Schmidt . |
| 3,194,609 | 7/1965 | Thurlow . |
| 3,298,406 | 1/1967 | Erickson . |
| 3,377,875 | 4/1968 | Sand . |
| 3,448,629 | 6/1969 | Pfrank et al. . |
| 3,495,468 | 2/1970 | Griffel .................................. 474/157 |
| 3,604,755 | 9/1971 | Krekeler . |
| 3,824,869 | 7/1974 | Murphy . |
| 3,956,943 | 5/1976 | Yamasaki . |

(List continued on next page.)

OTHER PUBLICATIONS

International Standard ISO 606:1994(E), entitled "Short–pitch transmission precision roller chains and chain wheels." (19 pgs.).

DE–vol. 46, Mechanical Design and Synthesis ASME 1992, entitled "On The Dynamic Analysis of Roller Chain Drives: Part 1 —Theory." (pp. 431–439).

*Primary Examiner*—Thomas R. Hannon
*Assistant Examiner*—Matthew A. Kaness
*Attorney, Agent, or Firm*—Fay, Sharpe, Beall, Fagan, Minnich & McKee

[57] ABSTRACT

A unidirectional roller chain sprocket for use primarily in automotive engine chain drive applications which incorporates an asymmetrical tooth for improved noise reduction. The sprocket includes a first plurality of sprocket teeth each having a first engaging flank with a first contact point at which a roller contacts the first engaging flank, and a second plurality of sprocket teeth each having a second engaging flank with a second contact point at which a roller contacts the second engaging flank. The first engaging flanks include a flank flat which facilitates spacing the first contact point on the first engaging flank relative to the second contact point on the second engaging flank to effect a time delay between an initial roller to first sprocket tooth contact and an initial roller to second sprocket tooth contact. The flank flat is tangent to an engaging flank radius and a first root radius. The asymmetrical tooth profile may also incorporate one or more inclined root surfaces which provide tooth space clearance for maintaining the chain rollers in hard contact with the root surface in the sprocket wrap. The asymmetrical tooth profile may also incorporate added pitch mismatch wherein the sprocket chordal pitch is less than the chain link pitch to facilitate a "staged" roller-tooth contact as a roller moves into full mesh from an initial tangential impact at the flank flat.

25 Claims, 29 Drawing Sheets

U.S. PATENT DOCUMENTS

| | | | |
|---|---|---|---|
| 4,016,772 | 4/1977 | Clemens et al. | 474/156 |
| 4,036,071 | 7/1977 | McKnight et al. . | |
| 4,089,406 | 5/1978 | Teske et al. . | |
| 4,099,423 | 7/1978 | Mullins . | |
| 4,116,081 | 9/1978 | Luttrell et al. | 474/156 |
| 4,168,634 | 9/1979 | Griffel . | |
| 4,174,642 | 11/1979 | Martin et al. . | |
| 4,181,033 | 1/1980 | Nagano . | |
| 4,200,000 | 4/1980 | Fluehmann . | |
| 4,207,777 | 6/1980 | Fluehmann . | |
| 4,274,184 | 6/1981 | Nordtvedt . | |
| 4,294,132 | 10/1981 | Matusz . | |
| 4,342,560 | 8/1982 | Ledvina et al. . | |
| 4,378,965 | 4/1983 | Ishii et al. . | |
| 4,401,420 | 8/1983 | Kasuya et al. . | |
| 4,492,030 | 1/1985 | Beerens . | |
| 4,509,323 | 4/1985 | Ledvina et al. . | |
| 4,509,937 | 4/1985 | Ledvina et al. . | |
| 4,521,207 | 6/1985 | Husted . | |
| 4,522,611 | 6/1985 | Hiatt . | |
| 4,531,926 | 7/1985 | Reeves, Jr. . | |
| 4,559,028 | 12/1985 | Reeves, Jr. . | |
| 4,571,218 | 2/1986 | Reeves, Jr. . | |
| 4,604,080 | 8/1986 | Mizuno | 474/153 |
| 4,653,340 | 3/1987 | LaBate . | |
| 4,738,653 | 4/1988 | Riewerts et al. | 474/156 |
| 4,758,209 | 7/1988 | Ledvina . | |
| 4,758,210 | 7/1988 | Ledvina . | |
| 4,813,916 | 3/1989 | Valin . | |
| 4,832,668 | 5/1989 | Ledvina et al. . | |
| 4,878,886 | 11/1989 | Kitabayashi et al. | 474/153 |
| 4,889,521 | 12/1989 | Nagano . | |
| 4,911,032 | 3/1990 | Steele et al. . | |
| 4,915,604 | 4/1990 | Nagai . | |
| 4,915,675 | 4/1990 | Avramidis . | |
| 4,969,371 | 11/1990 | Allen . | |
| 5,015,218 | 5/1991 | Macchiarulo et al. | 474/152 |
| 5,022,280 | 6/1991 | Boiko et al. . | |
| 5,073,151 | 12/1991 | Nagano . | |
| 5,123,878 | 6/1992 | Nagano . | |
| 5,133,695 | 7/1992 | Kobayashi . | |
| 5,154,674 | 10/1992 | Avramidis et al. . | |
| 5,162,022 | 11/1992 | Kobayashi . | |
| 5,163,826 | 11/1992 | Cozens . | |
| 5,318,483 | 6/1994 | Reid et al. . | |
| 5,397,278 | 3/1995 | Suzuki et al. . | |
| 5,427,580 | 6/1995 | Ledvina et al. . | |
| 5,437,581 | 8/1995 | Ledvina et al. . | |
| 5,437,582 | 8/1995 | Romano . | |
| 5,470,282 | 11/1995 | Ledvina et al. . | |
| 5,503,598 | 4/1996 | Neuer et al. . | |

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 27
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 6.25 | 80.00 | 0 | 82.00 | -2 |
| 19 | 18.947 | 74.08 | 6.45 | 80.53 | 0 | 82.53 | -2 |
| 20 | 18.000 | 74.38 | 6.63 | 81.00 | 0 | 83.00 | -2 |
| 21 | 17.143 | 74.64 | 6.79 | 81.43 | 0 | 83.43 | -2 |
| 22 | 16.364 | 74.89 | 6.93 | 81.82 | 0 | 83.82 | -2 |
| 23 | 15.652 | 75.11 | 7.07 | 82.17 | 0 | 84.17 | -2 |
| 24 | 15.000 | 75.31 | 7.19 | 82.50 | 0 | 84.50 | -2 |
| 25 | 14.400 | 75.50 | 7.30 | 82.80 | 0 | 84.80 | -2 |
| 26 | 13.846 | 75.67 | 7.40 | 83.08 | 0 | 85.08 | -2 |
| 27 | 13.333 | 75.83 | 7.50 | 83.33 | 0 | 85.33 | -2 |
| 28 | 12.857 | 75.98 | 7.59 | 83.57 | 0 | 85.57 | -2 |
| 29 | 12.414 | 76.12 | 7.67 | 83.79 | 0 | 85.79 | -2 |
| 30 | 12.000 | 76.25 | 7.75 | 84.00 | 0 | 86.00 | -2 |

Fig. 28

RANDOM ENGAGEMENT ROLLER CHAIN SPROCKET HAVING IMPROVED NOISE CHARACTERISTICS

CROSS REFERENCE TO RELATED APPLICATIONS

This application claims the benefit of U.S. Provisional Patent Application Nos. 60/022,321, filed Jul. 25, 1996 and 60/032,379, filed Dec. 19, 1996.

BACKGROUND OF THE INVENTION

The present invention relates to the automotive timing chain art. It finds particular application in conjunction with a unidirectional roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to ISO (International Organization for Standardization) standard 606:1994(E). The ISO-606 standard specifies requirements for short-pitch precision roller chains and associated chain wheels or sprockets.

FIG. 1 illustrates a symmetrical tooth space form for an ISO-606 compliant sprocket. The tooth space has a continuous fillet or root radius $R_i$ extending from one tooth flank (i.e., side) to the adjacent tooth flank as defined by the roller seating angle $\alpha$. The flank radius $R_f$ is tangent to the roller seating radius $R_i$, at the tangency point TP. A chain with a link pitch P has rollers of diameter D, in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z), further define the ISO-606 compliant sprocket. The maximum and minimum roller seating angle a is defined as:

$$\alpha_{max}=(140°-90°)/Z \text{ and } \alpha_{min}=(120°-90°)/Z$$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. The taut strand 22 may be guided from the driven sprocket 14 to the drive sprocket 12 with a chain guide 26. A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy (EA) occurring during the meshing process. The magnitude of the impact energy is related to engine speed, chain mass, and the impact velocity between the chain and the sprocket at the onset of meshing. The impact velocity is affected by the chain-sprocket engagement geometry, of which an engaging flank pressure angle γ is a factor, where:

$$E_A = \frac{wP}{2000} V_A^2;$$

$$V_A = \frac{\pi n P}{30000} \sin\left(\frac{360}{Z} + \gamma\right);$$

$$\gamma = \frac{180 - A - \alpha}{2}; \text{ and}$$

$E_A$=Impact Energy [N·m]
$V_A$=Roller Impact Velocity [m/s]
γ=Engagingh Flank Pressure Angle
n=Engine Speed [RPM]
w=Chain Mass [Kg/m]
Z=Number of Sprocket Teeth
A=Tooth Angle (360°/Z)
α=Roller Seating Angle
P=Chain Pitch (Chordal Pitch)

The impact energy equation presumes the chain drive kinematics will conform generally to a quasi-static analytical model and that the roller-sprocket driving contact will occur at a tangency point TP (FIG.3) for the flank and root radii as the sprocket collects a roller from the span.

As shown in FIG. 3, the pressure angle γ is defined as the angle between a line A extending from the center of the engaging roller 25, when it is contacting the engaging tooth flank at the tangency point TP, through the center of the flank radius $R_f$, and a line B connecting the centers of the fully seated roller 28, when it is seated on root diameter $D_2$, and the center of the next meshing roller 30 as if it were also seated on root diameter $D_2$ in its engaging tooth space. The roller seating angles a and pressure angles γ listed in Table 1 are calculated from the equations defined above. It should be appreciated that γ is a minimum when α is a maximum. The exemplary 18-tooth ISO compliant sprocket 12 of FIG. 3 will have a pressure angle γ in the range of 12.5° to 22.5° as shown in Table 1.

FIG. 3 also shows the engagement path (phantom rollers) and the meshing contact position of roller 30 (solid) as the drive sprocket 12 rotates in the direction of arrow 11. It is assumed that the chain drive kinematics generally conform to, and can be represented by a quasi-static analytical model, and that the drive contact occurs at the tangency point TP. FIG. 3 depicts the theoretical case with chain roller 28 seated on root diameter $D_2$ of a maximum material sprocket with both chain pitch and sprocket chordal pitch equal to theoretical pitch P. For this theoretical case, the noise occurring at the onset of roller engagement has a radial component $F_{Ir}$ as a result of roller 28 colliding with the root surface $R_i$ and a tangential component $F_{It}$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have tangential and radial impacts (occurring in any order), would therefore seem to be at variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial collision during meshing, and its effect on the meshing noise levels, can be evaluated apart from the impact energy ($E_A$) equation.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between an unloaded roller and the sprocket as the roller travels around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap as the roller chain wears. The amount of pitch line clearance added to the tooth space defines a length of a short arc that is centered in the tooth space and forms a segment of the root diameter $D_2$. The root fillet radius $R_i$ is tangent to the flank radius $R_f$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at engagement.

Chordal action, or chordal rise and fall, is another important factor affecting the operating smoothness and noise levels of a chain drive, particularly at high speeds. Chordal action occurs as the chain enters the sprocket from the free span during meshing and it can cause a movement of the free chain in a direction perpendicular to the chain travel but in the same plane as the chain and sprockets. This chain motion resulting from chordal action will contribute an objectionable noise level component to the meshing noise levels, so it is therefore beneficial to reduce chordal action inherent in a roller chain drive.

FIGS. 4a and 4b illustrate the chordal action for an 18-tooth, ISO-606 compliant sprocket having a chordal pitch of 9.525 mm. Chordal rise 45 may conventionally be defined as the displacement of the chain centerline as the sprocket rotates through an angle A/2, where:

$$\text{Chordal rise} = r_p - r_c = r_p[1 - \cos(180°/Z)]$$

where $r_c$ is the chordal radius, or the distance from the sprocket center to a pitch chord of length P; $r_p$ is the actual theoretical pitch radius; and Z is the number of sprocket teeth.

It is known that a short pitch chain provides reduced chordal action compared to a longer pitch chain having a similar pitch radius. FIGS. 4a and 4b show only the drive sprocket 12 and assume a driven sprocket (not shown) also having 18-teeth and in phase with the drive sprocket shown. In other words, at T=0 (see FIG. 4a), both sprockets, substantially identical will have a tooth center at the 12 o'clock position. Accordingly, this chain drive arrangement under quasi-static conditions will have a top or taut strand that will move up and down in a uniform manner a distance equal to that of the chordal rise. At T=0, roller 46 is at the onset of meshing, with chordal pitch P horizontal and in line with taut strand 22. At T=0+(A/2), (FIG. 4b) roller 46 has moved to the 12 o'clock position.

For many chain drives, the drive and driven sprockets will be of different sizes and will not necessarily be in phase. The chain guide 26 (FIG. 2) has the primary purpose to control chain strand vibration in the taut span. The geometry of the guide-chain interface also defines the length of unsupported chain over which chordal rise and fall is allowed to articulate. FIG. 5 is an enlarged view of FIG. 2 showing the first roller 28 at the onset of engagement and a second roller 30 as the next roller about to mesh with sprocket 12. In this example, the chain guide 26 controls and guides the taut strand 22 except for five (5) unsupported link pitches extending between the chain guide 26 and the engaging roller 28. The taut strand 22 is horizontal when the roller 28 is at the 12 o'clock position.

With reference to FIGS. 6 and 7, the drive sprocket 12 is rotated in a clockwise direction to advance roller 28 to a new angular position (A/2)+ω, determined by the instant of sprocket engagement of roller 30. Roller 28 is considered to be seated and in hard contact with the root surface at $D_2$ at the onset of meshing of roller 30. As shown in FIG. 6, a straight line is assumed for the chain span from roller 28 to a chain pin center 48, about which the unsupported span from pin 48 to engaging roller 30 is considered to rotate. The location and chain-interfacing contour of the chain guide 26 will determine the number of free span pitches about which articulation will take place as a result of the chordal rise and fall during the roller meshing process.

As best seen in FIG. 7, assuming that rollers 28 and 30 are in hard contact with the sprocket root surfaces at $D_2$, the chordal rise is the perpendicular displacement of the center of roller 30 (located on the pitch diameter PD) from the taut span 22 path as it moves from its initial meshing position shown to the 12 o'clock position.

Accordingly, it is desirable to develop a new and improved roller chain drive system which meets the above-stated needs and overcomes the foregoing disadvantages and others while providing better and more advantageous results.

SUMMARY OF THE INVENTION

In accordance with one aspect of the present invention, a roller chain sprocket is disclosed. The roller chain sprocket includes a first plurality of sprocket teeth each having a first tooth profile including a first engaging flank with a first contact point at which a roller initially contacts the first engaging flank, a second plurality of sprocket teeth each having a second tooth profile including a second engaging flank with a second contact point at which a roller initially contacts the second engaging flank; and the first tooth profile including a flank flat on the first engaging flank which facilitates spacing the first contact point on the first engaging flank relative to the second contact point on the second engaging flank to alter an initial roller-to-first engaging flank contact relative to an initial roller-to-second engaging flank contact. Thus, the flank flat facilitates altering the meshing contact from the first profile to the second. That is, while the frequency of the contacts (at constant rpm) will be substantially identical for each tooth profile, the profile differences serve to shift the initial contact phasing, thereby altering the rhythm of the initial contacts from one profile to the other.

In accordance with another aspect of the present invention, a unidirectional roller chain drive system is disclosed. The unidirectional roller chain drive system includes a driving sprocket having sprocket teeth with engaging flanks and coast flanks, the engaging flanks cooperating with the coast flanks of adjacent teeth to define asymmetrical tooth spaces between the sprocket teeth, a driven sprocket having sprocket teeth with engaging flanks and coast flanks, the engaging flanks cooperating with the coast flanks of adjacent teeth to define asymmetrical tooth spaces between the sprocket teeth, a roller chain having rollers in engaging contact with the driving sprocket and the driven sprocket, and at least one of the driving sprocket and the driven sprocket including a first plurality of sprocket teeth each having a first engaging flank with a first contact point at which a roller initially contacts the first engaging flank, a second plurality of sprocket teeth each having a second engaging flank with a second contact point at which a roller initially contacts the second engaging flank, and the first engaging flank including a flank flat which facilitates phasing a frequency of initial roller-to-first engaging flank contacts relative to initial roller-to-second engaging flank contacts to alter the rhythm of the initial roller-to-first engaging flank and the roller-to-second engaging flank contacts. As with the first aspect of the invention, the flank flat facilitates altering the meshing contact from the first profile to the second.

In accordance with yet another aspect of the present invention, a roller chain sprocket is disclosed. The roller chain sprocket includes a first plurality of sprocket teeth each having a first engaging flank with a first contact point at which a roller initially contacts the first engaging flank, a second plurality of sprocket teeth each having a second engaging flank with a second contact point at which a roller initially contacts the second engaging flank, and the first engaging flank including a flank flat which facilitates phasing a frequency of initial roller-to-first engaging flank contacts relative to initial roller-to-second engaging flank contacts to alter the rhythm of the initial roller-to-first engaging flank and the roller-to-second engaging flank contacts.

One advantage of the present invention is the provision of a roller chain sprocket which incorporates a flank flat on an engaging tooth surface which facilitates altering a meshing contact from a first tooth profile to a second tooth profile.

Another advantage of the present invention is the provision of a roller chain sprocket which incorporates a flank flat on an engaging tooth surface which effects a time delay between an initial roller-to first sprocket tooth profile contact and an initial roller-to-second sprocket tooth profile contact.

Another advantage of the present invention is the provision of a roller chain sprocket which incorporates a flank flat on an engaging tooth surface of a first tooth profile which facilitates phasing a frequency of initial roller-to-engaging flank contacts of the first tooth profile relative to initial roller-to-engaging flank contacts of a second tooth profile to alter the rhythm of the initial roller-to-first engaging flank and the roller-to-second engaging flank contacts.

Another advantage of the present invention is the provision of a roller chain sprocket which incorporates added pitch mismatch between the sprocket and roller chain to facilitate a "staged" roller-to-sprocket impact.

Still another advantage of the present invention is the provision of a roller chain sprocket which incorporates an inclined root surface on an engaging flank, a coast flank, or both an engaging flank and a coast flank to provide tooth space clearance.

Yet another advantage of the present invention is the provision of a roller chain sprocket which minimizes impact noise generated by a roller-sprocket collision during meshing.

A further advantage of the present invention is the provision of a roller chain sprocket which minimizes broadband mechanical noise generated by unloaded rollers in a sprocket wrap.

A still further advantage of the present invention is the provision of a roller chain sprocket which provides a. "staged" roller impact wherein a tangential impact at full mesh occurs first followed by a radial impact.

Yet a further advantage of the present invention is the provision of a roller chain sprocket which spreads roller engagement over a significant time interval to provide for a more gradual load transfer, thereby minimizing roller-sprocket impact and the inherent noise generated therefrom.

Yet a further advantage of the present invention is the provision of a roller chain sprocket having two sets of sprocket teeth incorporating different tooth profiles which cooperate to reduce chain drive system noise levels below a noise level which either tooth profile used alone would produce.

Further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 27 is a table listing roller seating angles ($\alpha$) and pressure angles ($\gamma$) for a number of different ISO-606 compliant roller chain sprockets; and FIG. 28 is a table listing the maximum ($\beta$) angles and the corresponding minimum pressure angles ($\gamma$) for three different asymmetrical tooth space profiles (1–3) of varying sprocket sizes.

DETAILED DESCRIPTION OF THE PREFERRED EMBODIMENT

Figure 8:
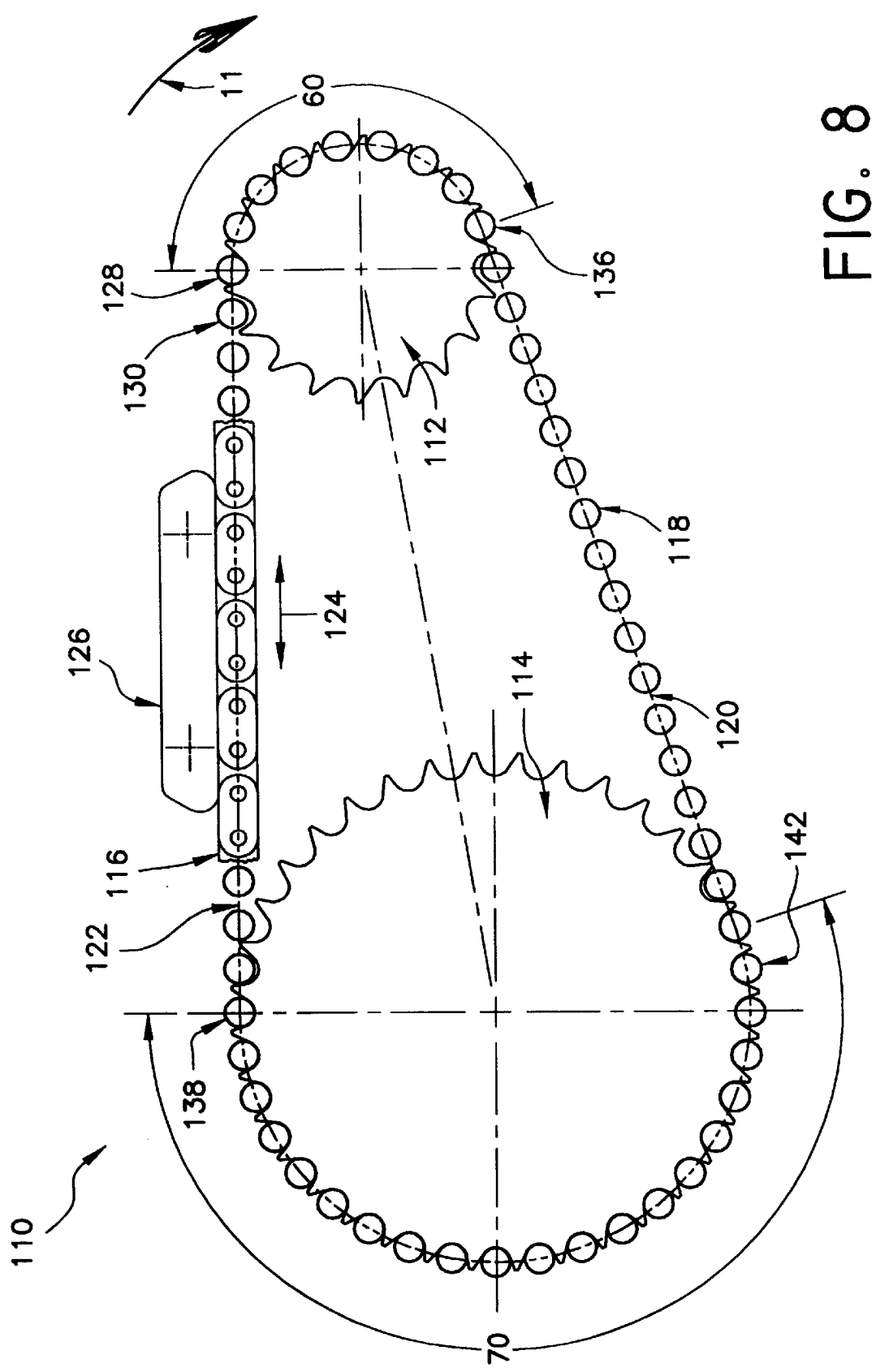
FIG. 8 illustrates a roller chain drive system having a roller chain drive sprocket and driven sprocket which incorporate the features of the present invention therein.

With reference now to FIG. 8, a roller chain drive system 110 includes a drive sprocket 112 and a driven sprocket 114 which incorporate the features of the present invention therein. The roller chain drive system 110 further includes a roller chain 116 having a number of rollers 118 which engage and wrap about sprockets 112, 114. The roller chain rotates in a clockwise direction as shown by arrow 11.

The roller chain 116 has two spans extending between the sprockets, slack strand 120 and taut strand 122. The roller chain 116 is under tension as shown by arrows 124. A central portion of the taut strand 122 may be guided from the driven sprocket 114 to the drive sprocket 112 with a chain guide 126. A first roller 128 is shown fully seated at a 12 o'clock position on the drive sprocket 112. A second roller 130 is adjacent to the first roller 128 and is about to mesh with the drive sprocket 112.

To facilitate the description of an asymmetrical tooth profile of the present invention, reference will be made only to the drive sprocket 112. However, the asymmetrical tooth profile of the present invention is equally applicable to the driven sprocket 114, as well as to idler sprockets and sprockets associated with counter rotating balance shafts.

Figure 9:
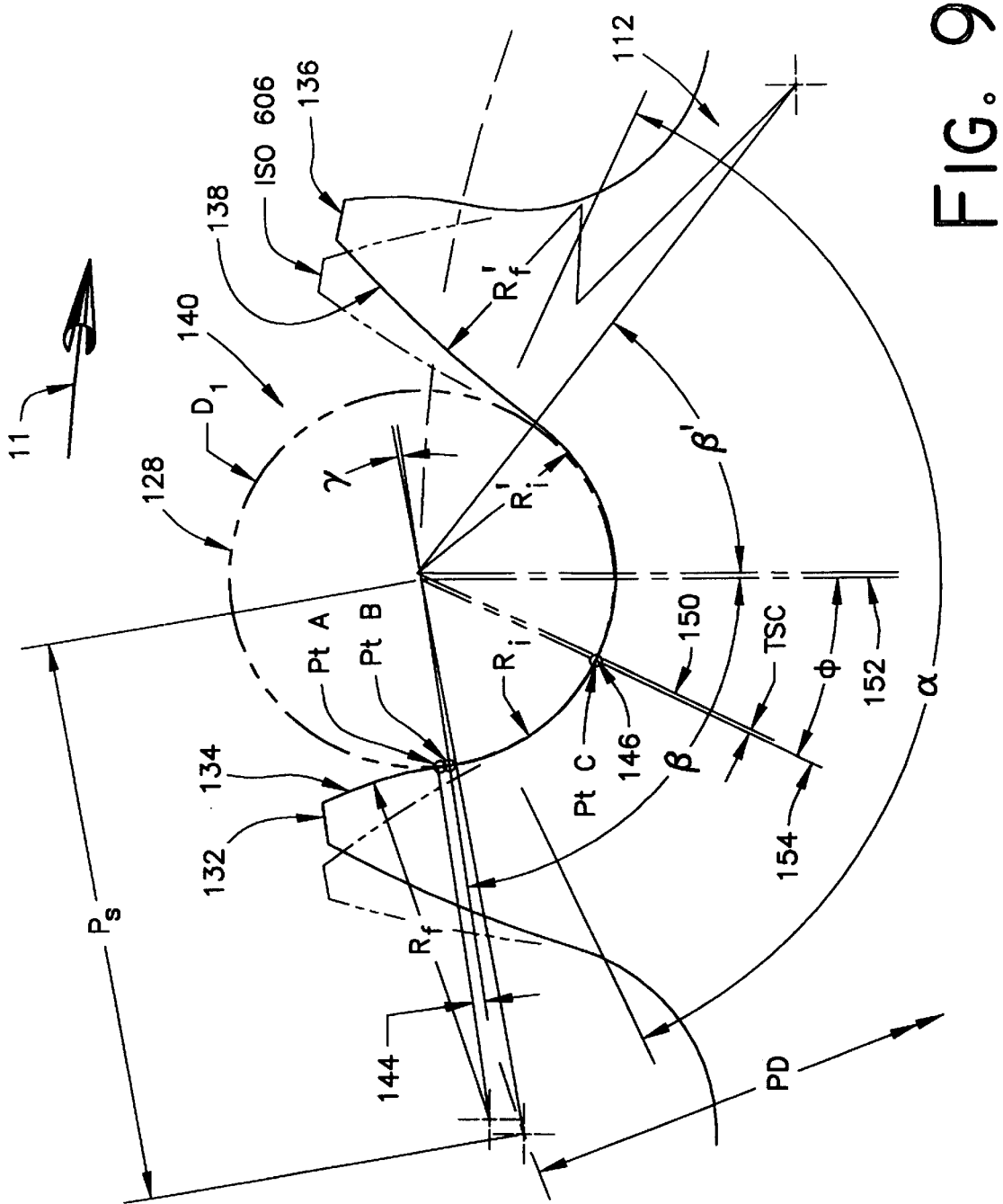
FIG. 9 illustrates the roller chain drive sprocket of FIG. 8 with an asymmetrical tooth space form in accordance with a first embodiment of the present invention.
Figure 10:
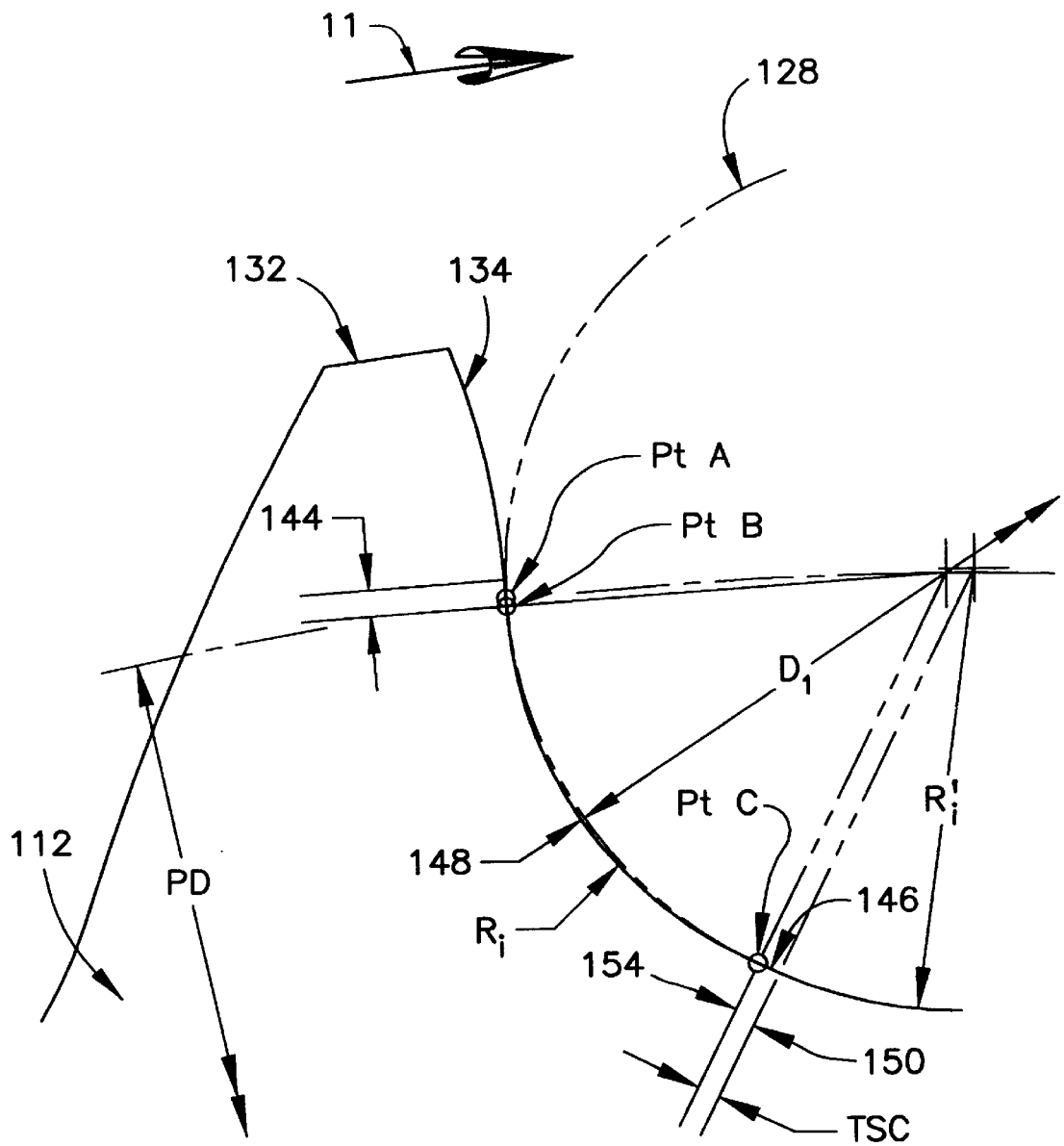
FIG. 10 is an enlarged view of the asymmetrical tooth space form of FIG. 9 showing a roller in two-point contact with the sprocket.

Referring now to FIGS. 9 and 10, the sprocket 112 includes a first tooth 132 having an engaging flank 134, and a second tooth 136 having a coast or disengaging flank 138. The engaging flank 134 and coast flank 138 cooperate to define a tooth space 140 which receives the engaging roller 128 (shown in phantom). The engaging roller 128 has a roller diameter $D_1$, and is shown fully seated in two-point contact within the tooth space 140 as described further below. More particularly, the engaging roller 128, when fully seated in the tooth space, contacts two lines B and C that extend axially along each sprocket tooth surface (i.e., in a direction orthogonal to the plane of the drawings). However, to facilitate a description thereof, the lines A, B, and C are hereafter shown and referred to as contact points within the tooth space.

The engaging flank has a radius $R_f$ which is tangent to a radially outer end of a flank flat 144. The location of the flank flat 144 is defined by an angle β, with the flat orientation being normal or perpendicular to a line that passes through Point B and the center of roller 128 when the roller is contacting the sprocket at Points B and C. The length of the flank flat extending radially outward from Point B affects a time delay between an initial tangential impact between sprocket 112 and roller 128 at a first contact Point A along the flank flat 144, and a subsequent radial impact at Point C. It is believed that the roller stays in contact with the flank flat from its initial tangential contact at Point A until the roller moves to a fully engaged two-point contact position at Points B and C. The pressure angle γ, the amount of pitch mismatch between the chain and the sprocket, and the length of the flank flat can be varied to achieve a desired initial roller contact Point A at the onset of roller-sprocket meshing.

It should be appreciated that flank (tangential) contact always occurs first, with radial contact then occurring always at Point C regardless of chain pitch length. In contrast, with known tooth space forms (e.g., ISO compliant and asymmetrical) incorporating single point contact (e.g. single line contact), an engaging roller must move to a driving position after making radial contact. The pressure angles γ therefore assume that the engaging roller will contact at the flank radius/root radius tangency point. Thus, the meshing contact location of the known single point/line tooth space forms is pitch "sensitive" to determine where the radial impact as well as tangential impact will occur.

The engaging flank roller seating angle β (FIG. 9) and a disengaging flank roller seating angle β' replace the ISO-606 roller seating angle α (ISO profile shown in phantom). The pressure angle γ is a function of the engaging flank roller seating angle β. That is, as β increases, γ decreases. A minimum asymmetrical pressure angle can be determined from the following equation, where:

$$\gamma_{min} = \beta_{max} - (\alpha_{max}/2 + \gamma_{ISO\ min})$$

Figure 26:
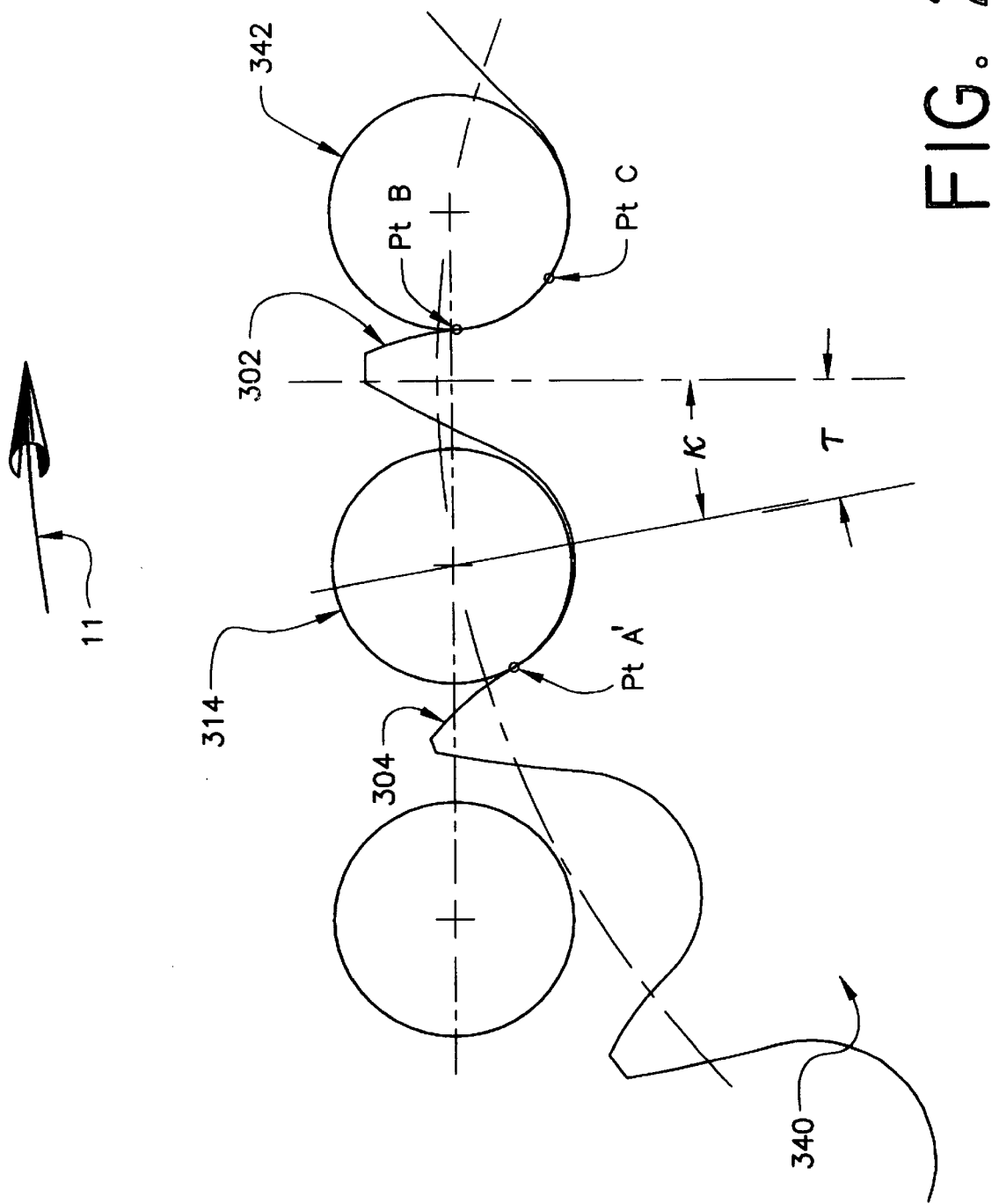
FIG. 26 illustrates the sprocket of FIG. 25 rotated in a clockwise direction until the instant of initial tangential contact between the third roller and the roller chain drive sprocket.

Therefore, an asymmetrical pressure angle $\gamma_{min} = 0$ when $\beta_{max} = (\alpha_{max}/2 + \gamma_{ISO\ min})$ as illustrated in FIG. 28 FIG. 26 lists the maximum Beta (β) angles and the corresponding minimum pressure angles (γ) for several sprocket sizes and several asymmetrical profiles. It should be appreciated that reducing the engaging flank pressure angle γ reduces the tangential impact force component $F_{IA}$ (FIG. 14) and thus the tangential impact noise contribution to the overall noise level at the onset of engagement.

Impact force $F_{IA}$ is a function of the impact velocity which in turn is related to pressure angle γ. As pressure angle γ is reduced, it provides a corresponding reduction in the impact velocity between the chain and the sprocket at the onset of meshing. A minimum pressure angle γ also facilitates a greater separation or distance between tangential contact points A and B to further increase or maximize engagement "staging". In the preferred embodiment, the engaging flank pressure angle γ is in the range of about −2.0° to about +5° to optimize the staged impact between the roller and the sprocket.

Figure 1:
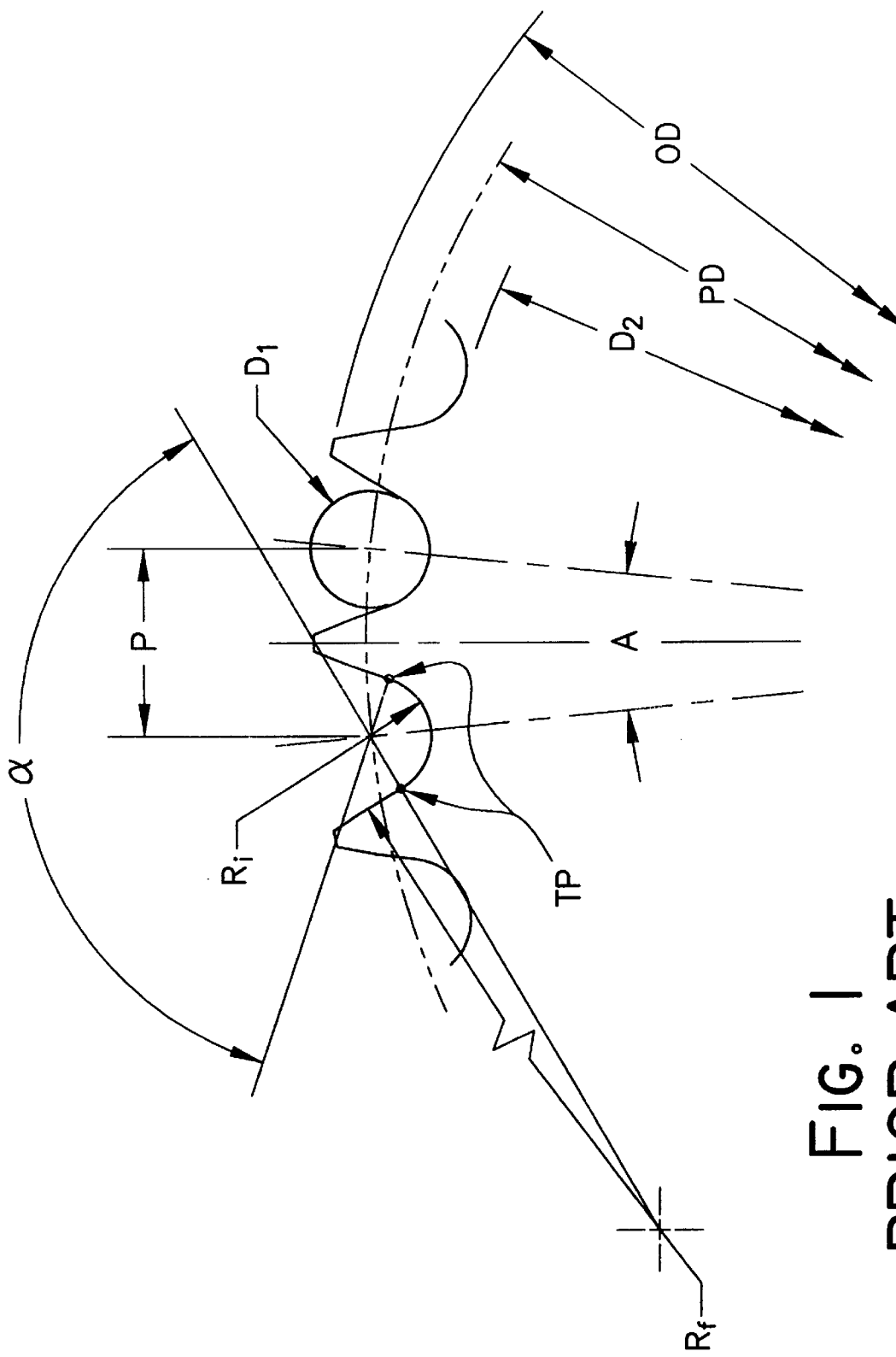
FIG. 1 illustrates a symmetrical tooth space form for an ISO-606 compliant roller chain sprocket.
Figure 2:
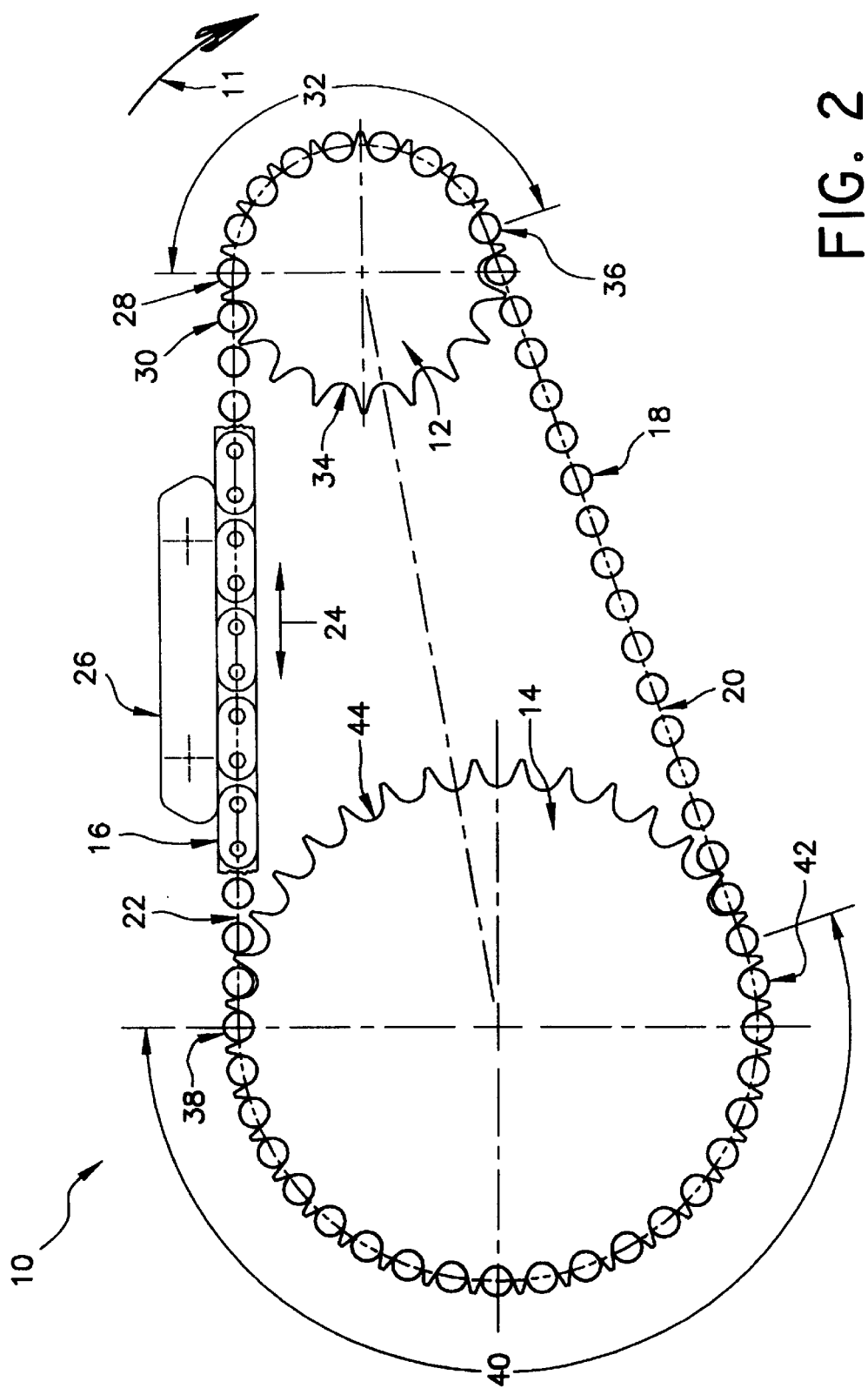
FIG. 2 is an exemplary roller chain drive system having a ISO-606 compliant drive sprocket, driven sprocket, and roller chain.
Figure 3:
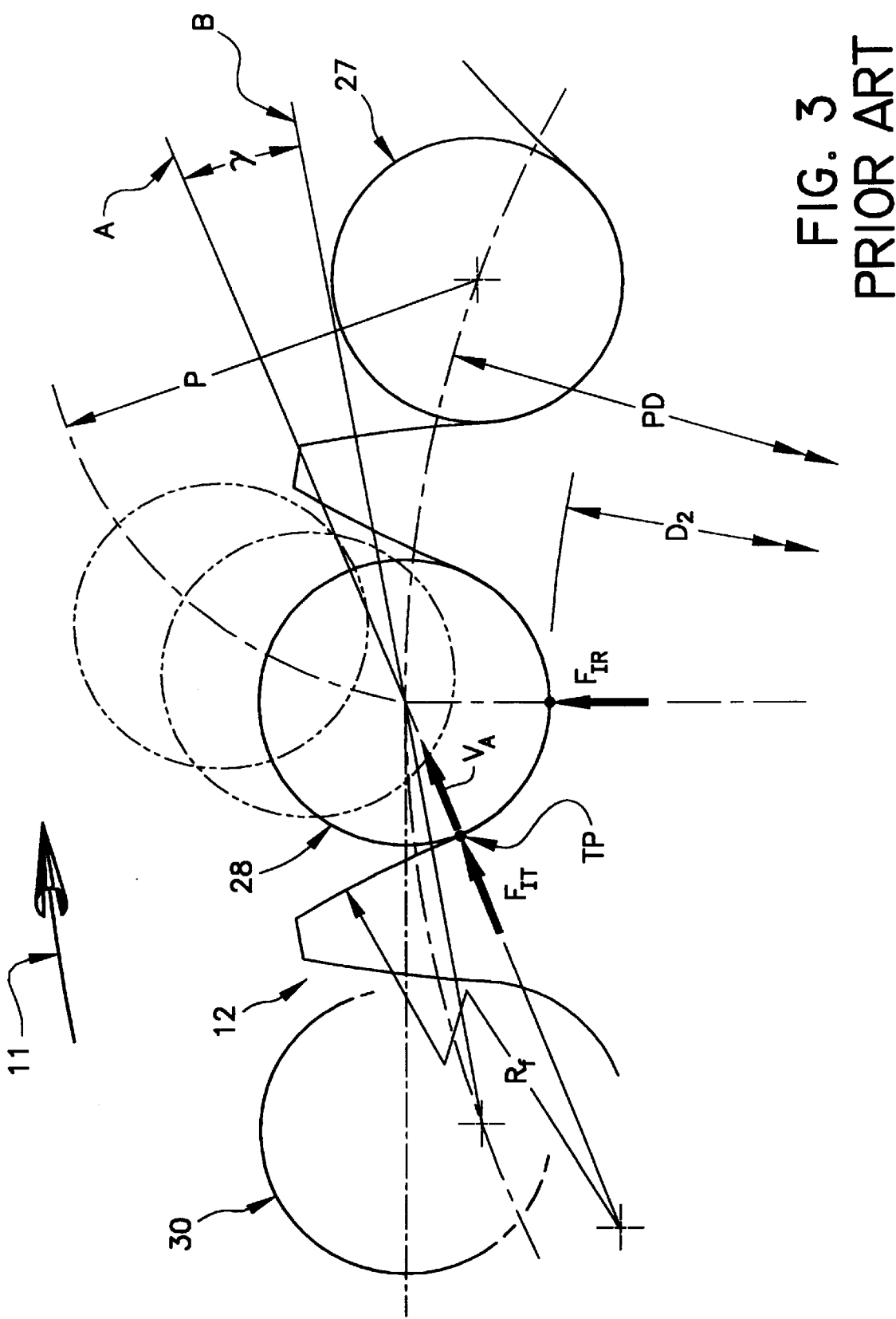
FIG. 3 shows an engagement path (phantom) and a roller (solid) in a driving position as an ISO-606 compliant drive sprocket rotates in a clockwise direction.
Figures 4A, 4B:
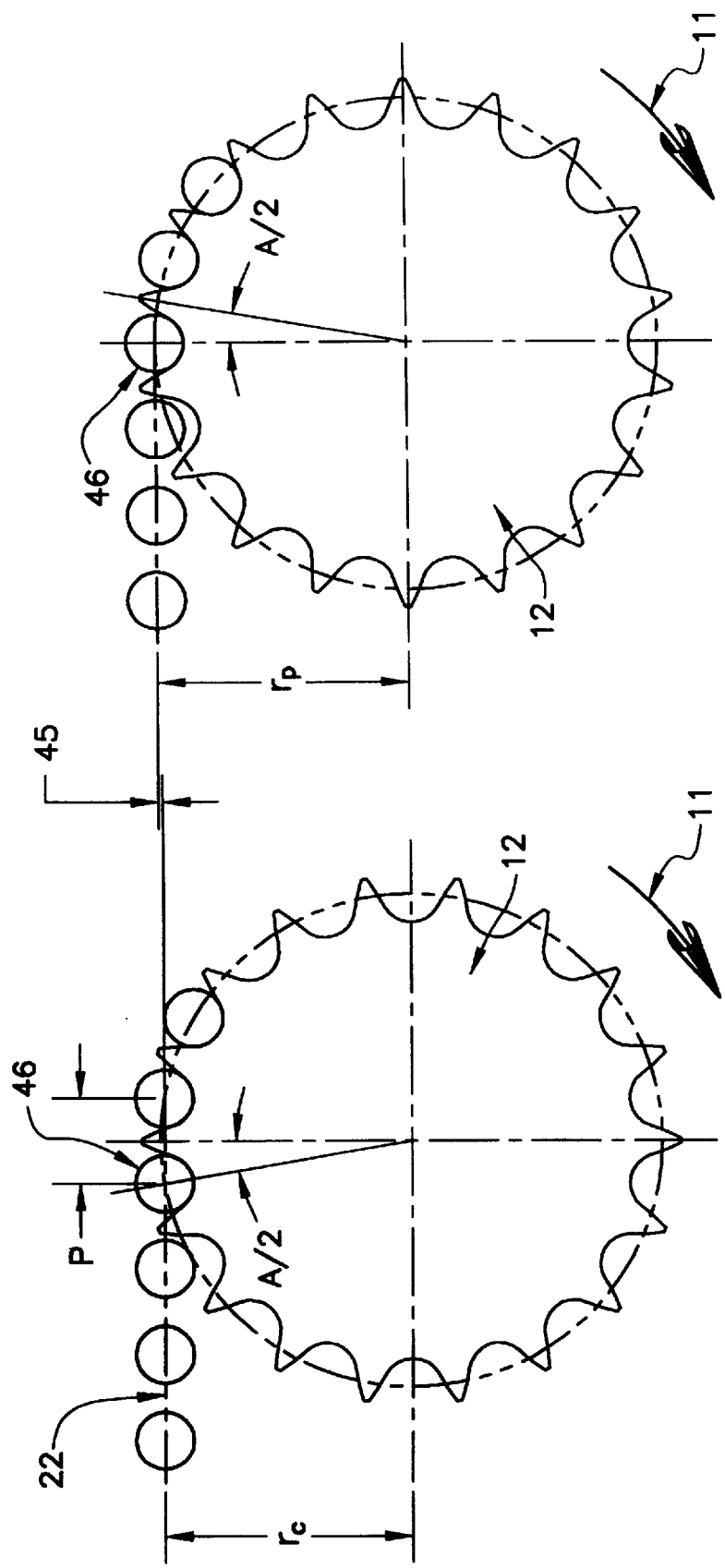
FIG. 4a shows a roller at the onset of meshing with an exemplary 18-tooth sprocket.
FIG. 4b shows the drive sprocket of FIG. 4a rotated in a clockwise direction until the roller is at a 12 o'clock position.
Figure 5:
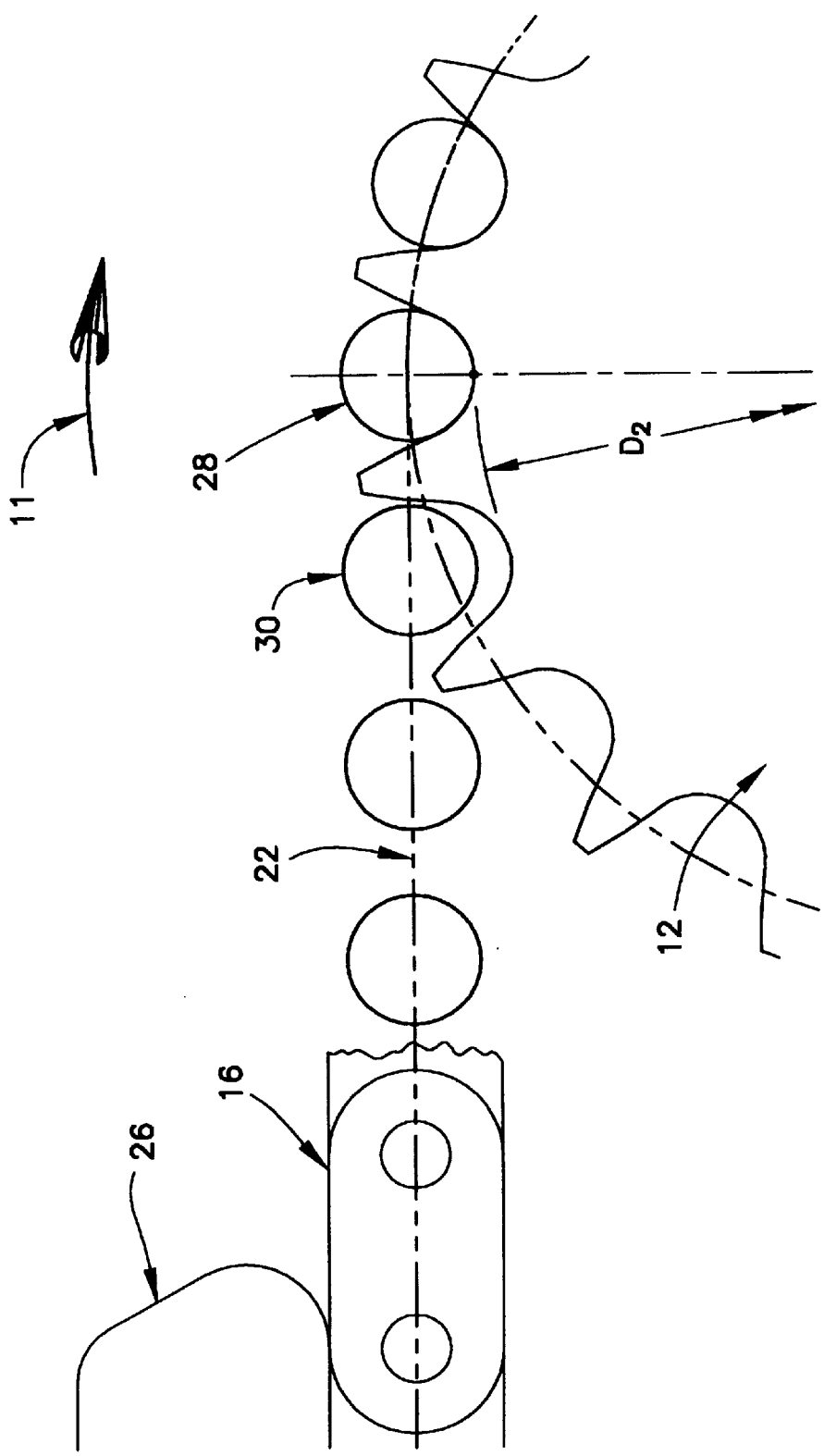
FIG. 5 is an enlarged view of the drive sprocket of FIG. 2 with a roller fully seated in a tooth space and a second roller about to mesh with the drive sprocket.
Figure 6:
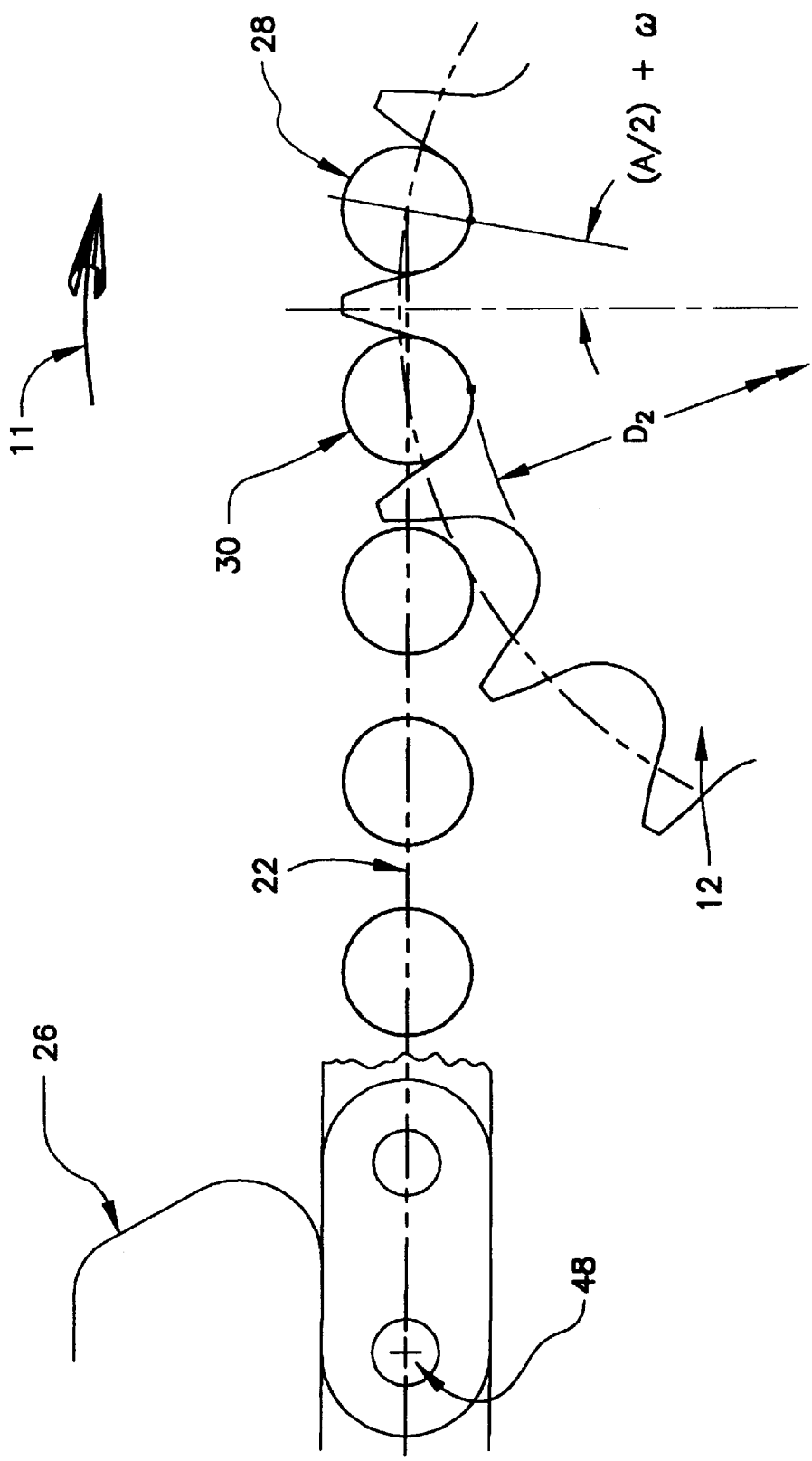
FIG. 6 shows the drive sprocket of FIG. 5 rotated in a clockwise direction until the second roller initially contacts the drive sprocket.
Figure 7:
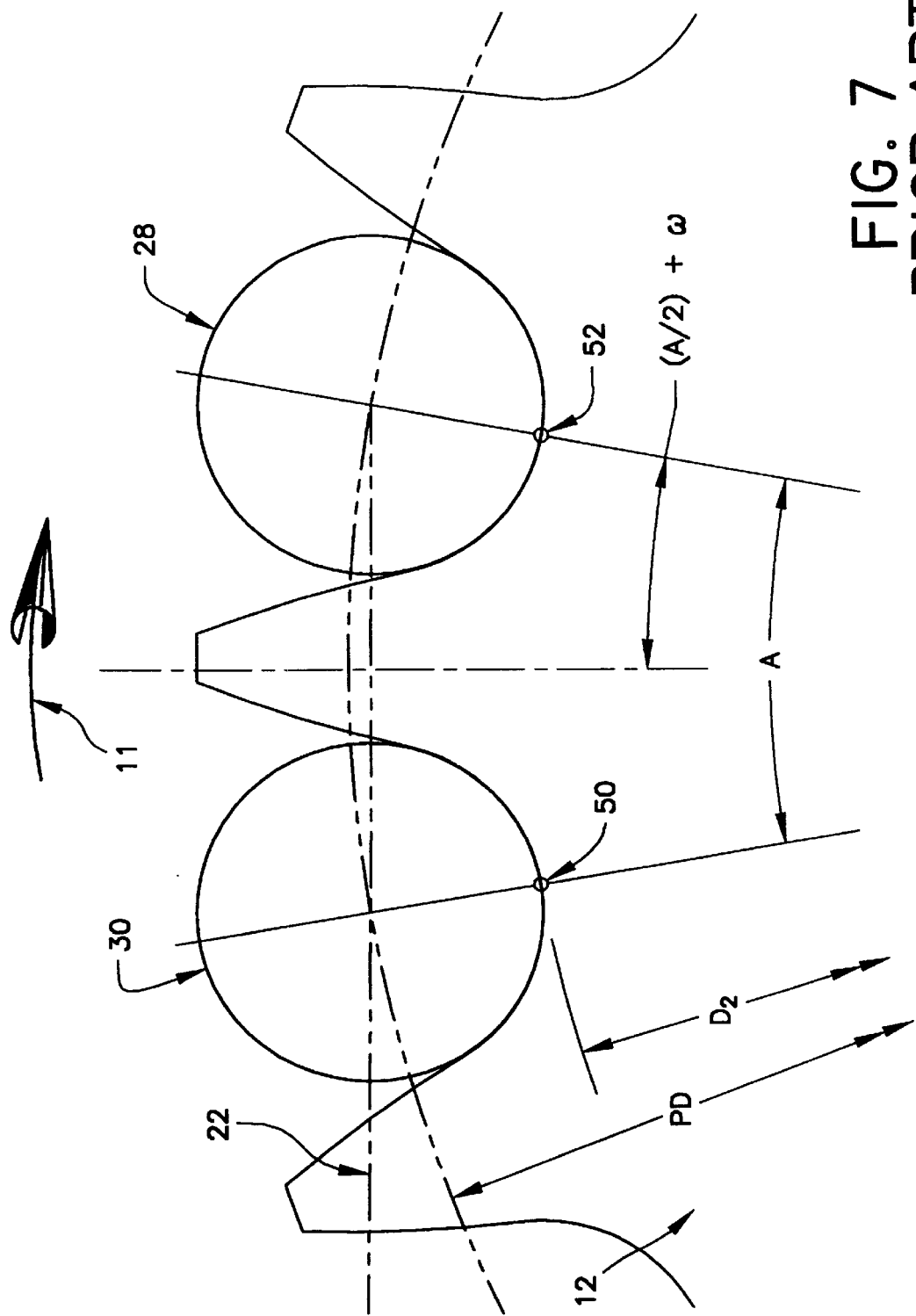
FIG. 7 is an enlarged view of FIG. 6 showing that the second roller initially contacts a root surface (i.e., radial impact) of the drive sprocket, under theoretical conditions.
Figure 11:
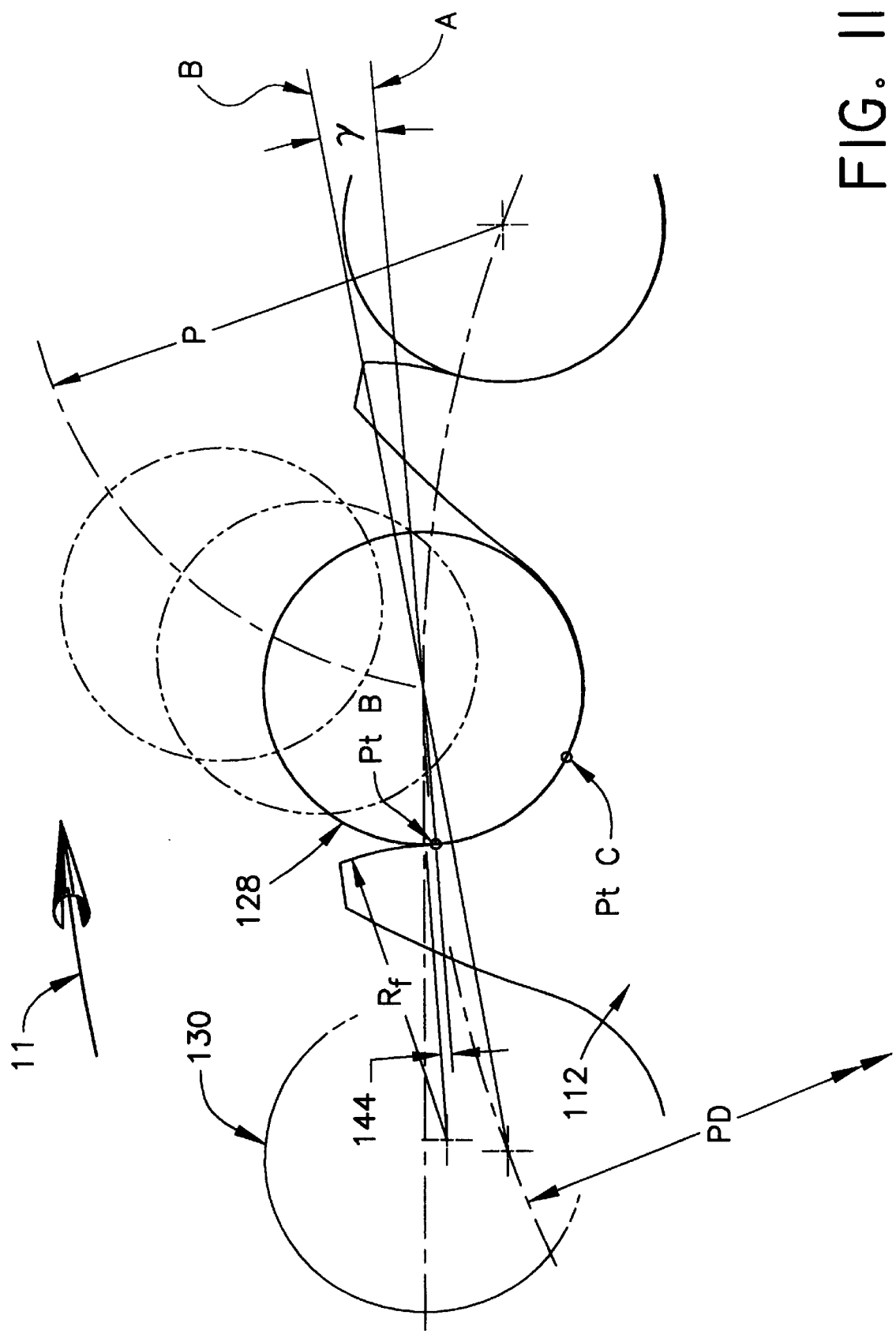
FIG. 11 shows an engagement path (phantom) and the full mesh position (solid) of a roller as the drive sprocket of FIG. 8 rotates in a clockwise direction.

In the embodiment being described, roller seating angle β is greater than ISO $\alpha_{max}/2$ at a maximum material condition and β can be adjusted until a desired engaging flank pressure angle γ is achieved. For instance, the roller seating angle β of FIG. 9 provides a pressure angle γ that is less than zero, or a negative value. The negative pressure angle γ is best seen in FIG. 11, as contrasted with the ISO-606 compliant tooth profile of FIG. 3 with a positive pressure angle γ. As shown in FIG. 11, the asymmetrical profile pressure angle γ is defined as the angle between a line A extending from the center of the fully engaged roller 128, when it is contacting the engaging tooth flank at points B and C, through point B, and a line B connecting the centers of the fully seated roller 128, and the center of the next meshing roller 130 as if it were also two-point seated at full mesh in its engaging tooth space.

It is believed that a small negative pressure angle for the theoretical chain/sprocket interface beneficially provides a pressure angle γ closer to zero (0) for a "nominal" system or for a system with wear. However, the engaging flank roller seating angle β may be beneficially adjusted so as to provide any engaging flank pressure angle γ having a value less than the minimum ISO-606 pressure angle.

Referring again to FIGS. 9 and 10, a first root radius $R_i$ is tangent to a radially inner end of the flank flat 144, and tangent to a radially outer end of an inclined root surface 146. As best seen in FIG. 10, a maximum root radius $R_i$ must be equal to, or less than, a minimum roller radius $0.5D_1$ to facilitate the fully engaged two-point/line contact at Points B and C. Accordingly, this will define a small clearance 148 (FIG. 10) between the engaging flank 134 at root radius $R_i$ and roller 128 at full mesh (i.e., two-point/line contact). The flank flat 144 and the inclined root surface 146 necessarily extend inside Points B and C respectively to facilitate the two-point/line roller contact at full engagement for all dimensional tolerance conditions of the roller 128 diameter ($D_1$) and the root radius $R_i$. A second root radius $R_i'$ is tangent to a radially inner end of the inclined root surface 146 at line 150. The coast flank has a radius $R_f'$ with its arc center defined by disengaging side roller seating angle β'.

The inclined root surface 146 is a flat surface having a finite length which defines a tooth space clearance (TSC). The tooth space clearance compensates for chain pitch elongation or chain wear by accommodating a specified degree of chain pitch elongation ΔP. In other words, the tooth space clearance TSC enables rollers of a worn chain to be maintained in hard contact with the inclined root surface of the sprocket teeth. In addition, the inclined root surface 146 facilitates reducing the radial reaction force thereby reducing the roller radial impact noise contribution to the overall noise level.

The inclined root surface 146 may be inclined at any angle φ necessary to satisfy a specific chain drive geometry and chain pitch elongation. As shown in FIG. 9, the inclined root surface angle φ is measured from a line 152 passing through the center of roller 128 and the sprocket center to a second line 154 which also passes through the center of roller 128 and Point C. The inclined root surface 146 is normal to the line 154, and the inclined root surface extends radially inward to line 150 where it is tangent to $R_i'$. In the embodiment being described, the inclined root surface angle φ is preferably in the range of about 20° to about 35°.

Figure 12:
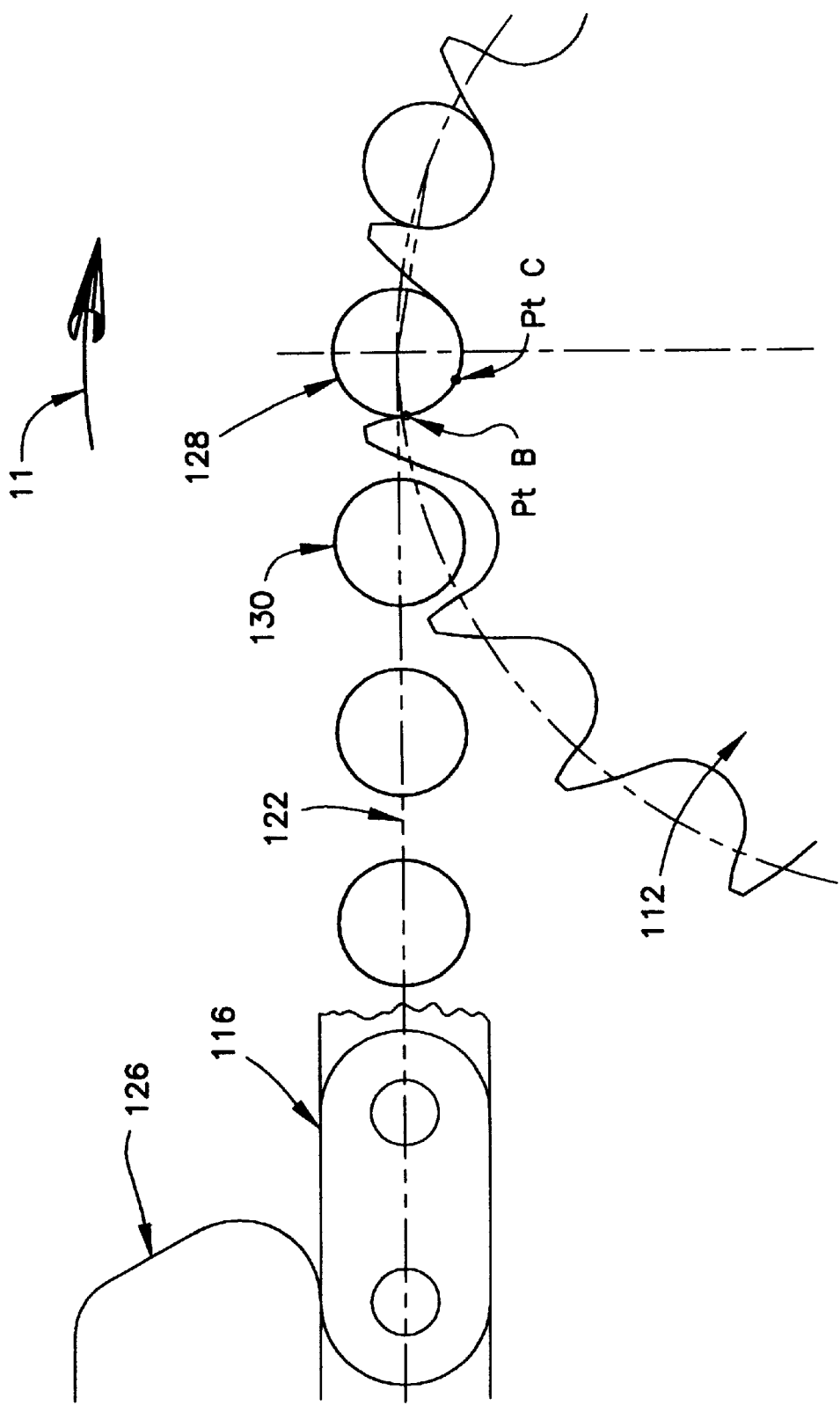
FIG. 12 is an enlarged view of the drive sprocket of FIG. 8 with a roller fully seated in a tooth space and a second roller as the next roller to be collected from a taut span of the roller chain.

FIG. 12 is an enlarged view of FIG. 8 showing the first roller 128 at full engagement in two-point/line contact across the thickness or width of the sprocket tooth profile, and the second roller 130 as the next roller about to mesh with sprocket 112. As with the ISO compliant drive system 10, the chain guide 126 controls and guides a central portion the taut strand 122 except for five unsupported link pitches extending between the chain guide 126 and the engaging roller 128 (and except for the unsupported link pitches extending between the driven sprocket and the chain guide). The taut strand 122 is horizontal when roller 128 is at the 12 o'clock position.

Figure 13:
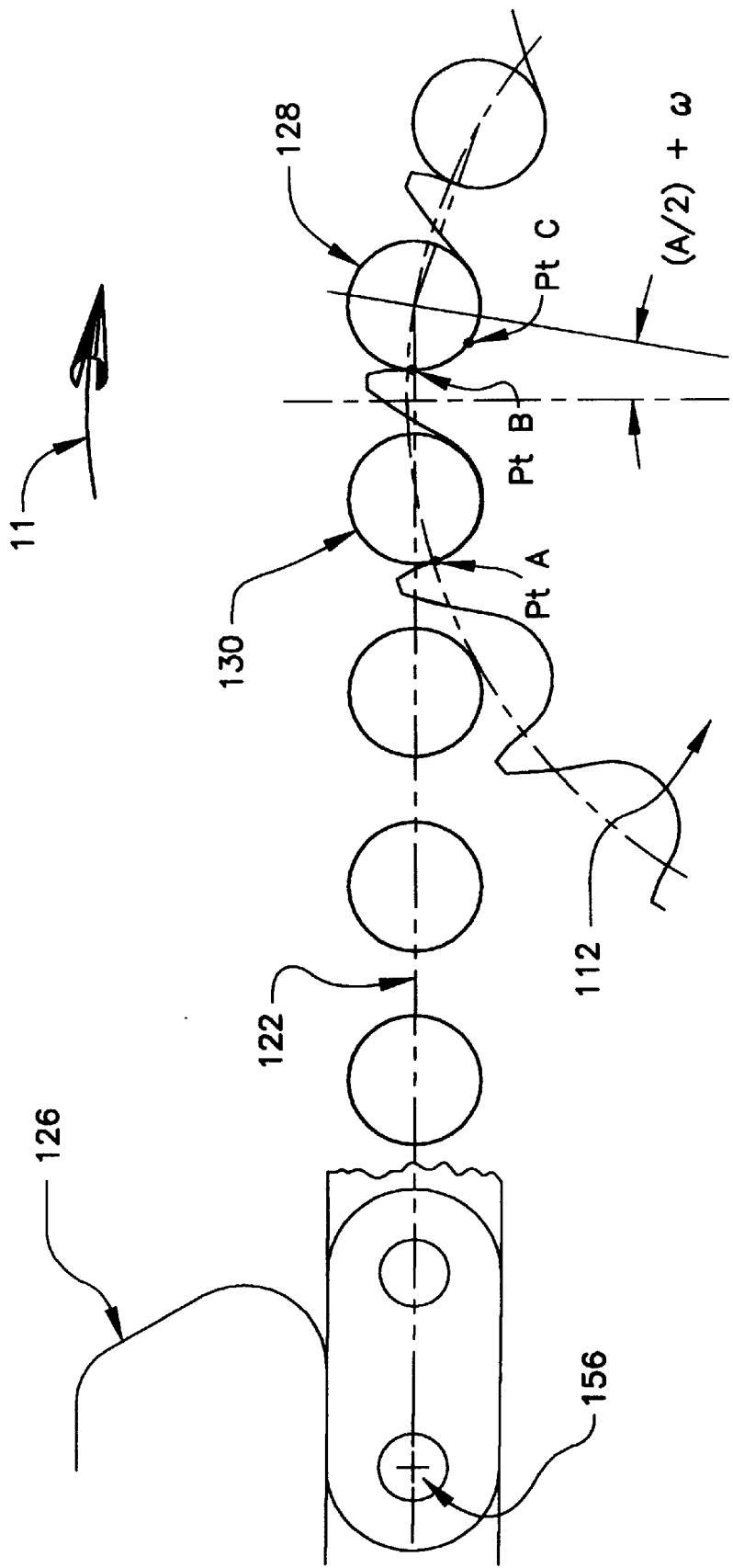
FIG. 13 shows the drive sprocket of FIG. 12 rotated in a clockwise direction until the second roller initially contacts the drive sprocket.

FIG. 13 shows the drive sprocket 112 rotated in a clockwise direction (A/2)+ω, as determined by the instant of sprocket engagement by roller 130. A straight line is assumed for the chain span from roller 128 to a chain pin center 156, about which the unsupported span from pin center 156 to engaging roller 130 is considered to rotate. It should be appreciated that the straight line assumption is valid only in a quasi-static model. The amount of movement (or deviation from the straight line assumption) previously mentioned will be a function of the drive dynamics as well as the drive and sprocket geometry.

The sprocket contact at the onset of mesh for roller 130 occurs earlier than for the ISO counterpart, thereby reducing the amount of chordal rise and, just as importantly, allows the initial contact to beneficially occur at a desired pressure angle γ on the engaging flank at Point A. Furthermore, the radial sprocket contact for roller 130, with its contribution to the overall noise level, does not occur until the sprocket rotation places roller 130 at the 12 o'clock position. This is referred to as staged engagement.

Figure 14:
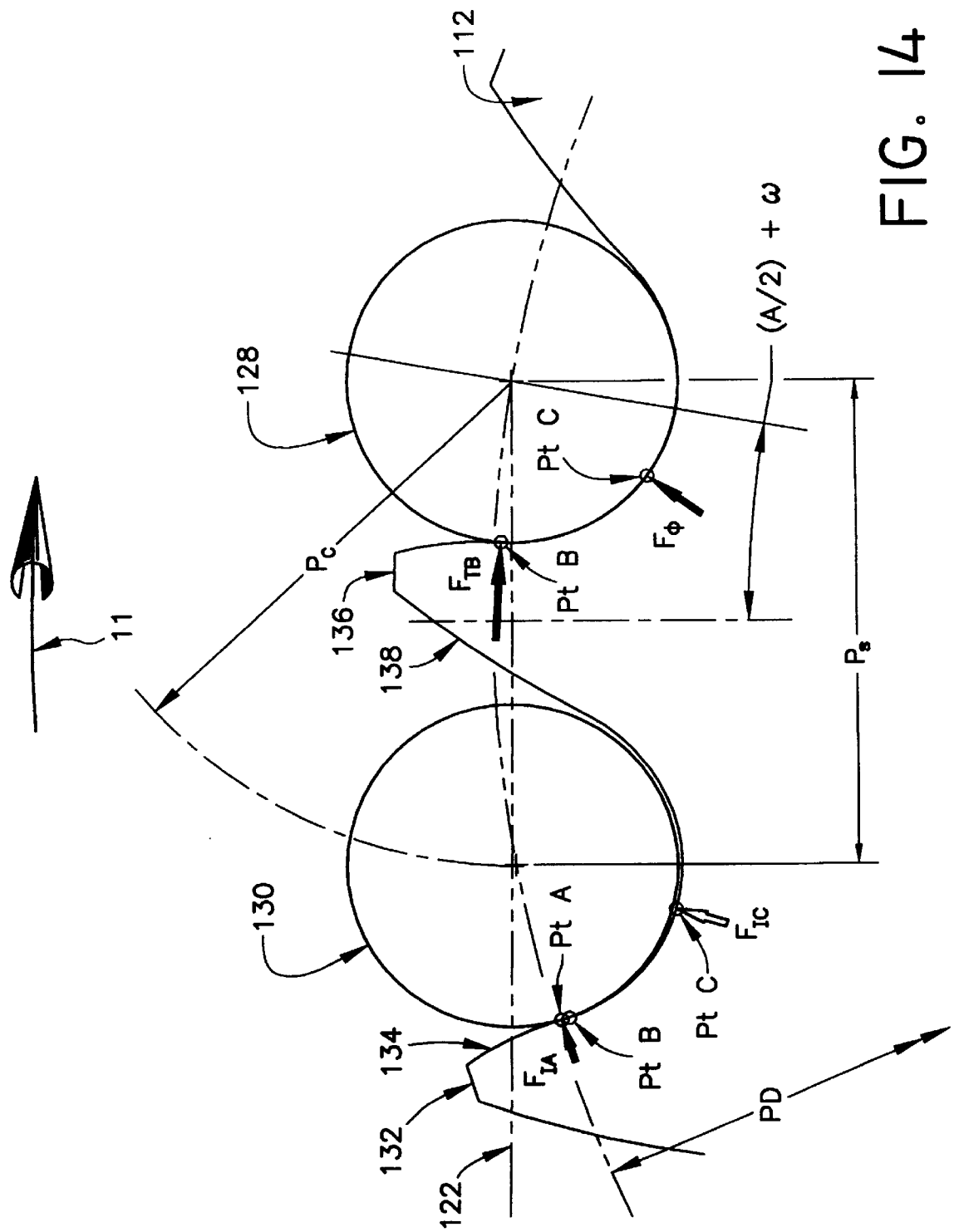
FIG. 14 is an enlarged view of FIG. 13 showing the first roller in two-point contact and second roller at initial tangential contact with the drive sprocket.

FIG. 14, an enlarged view of FIG. 13, more clearly shows the onset of meshing for roller 130. Just prior to the onset of mesh, roller 128 is assumed to carry the entire taut strand load $F_{TB}+F_\phi$, which load is shown as force vector arrows. Actually, the arrows represent reaction forces to the taut strand chain force. At the instant of mesh for roller 130, a tangential impact occurs as shown by impact force vector $F_{IA}$. The tangential impact is not the same as the taut strand chain loading. In particular, impact loading or impact force is related to the impact velocity $V_A$. It is known that impact occurs during a collision between two bodies, resulting in relatively large forces over a comparatively short interval of time. A radial impact force vector $F_{IC}$ is shown only as an outline in that the radial impact does not occur until the sprocket has rotated sufficiently to place roller 130 at a 12 o'clock position.

Figure 14A:
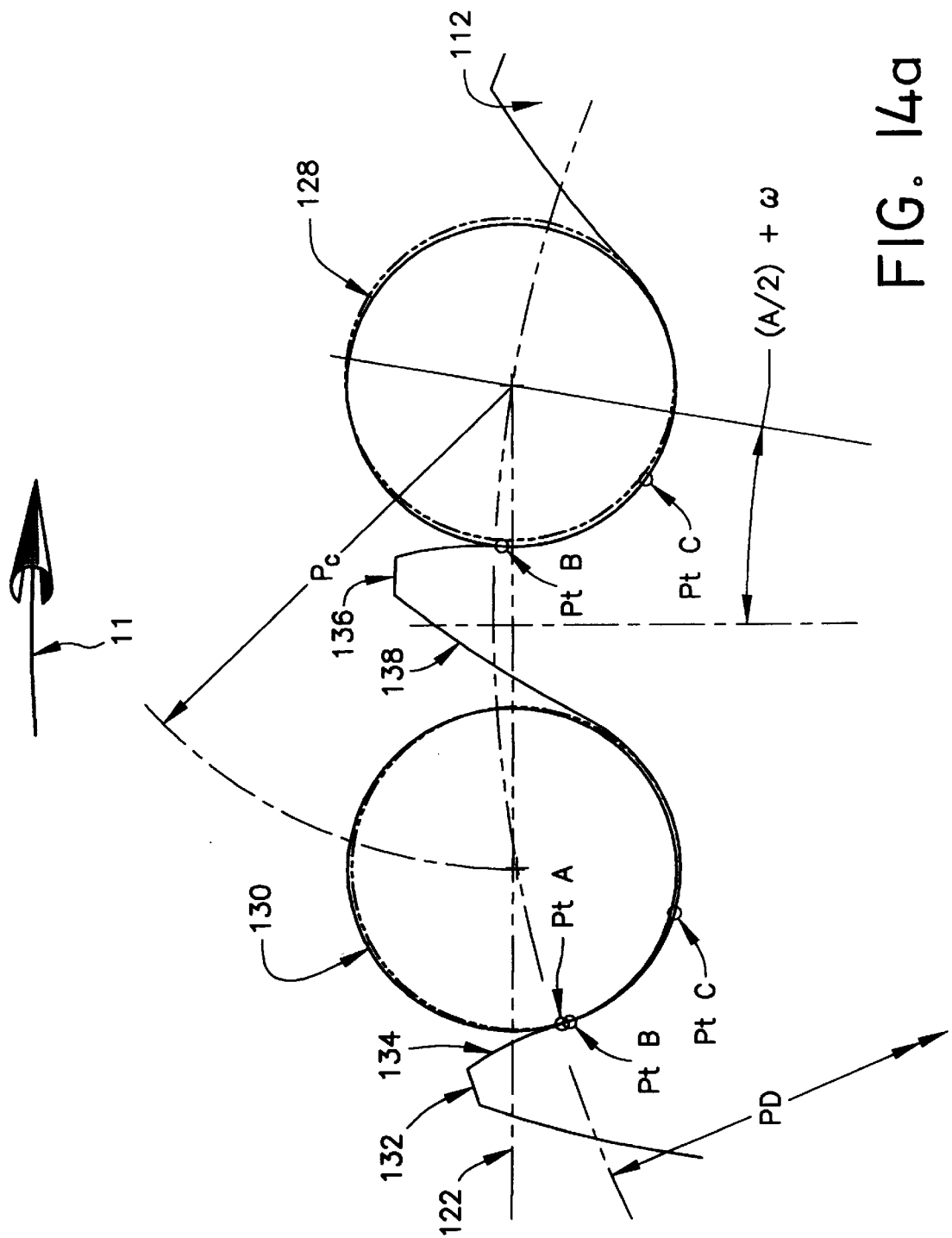
FIG. 14a illustrates the progression of a first and a second roller as the roller chain drive sprocket of FIG. 8 is rotated in a clockwise direction.

FIG. 14a shows the same roller positions (solid) for rollers 128 and 130 as shown in FIG. 14, but in addition, shows the roller positions (in phantom) relative to the sprocket profile once roller 130 reaches its two-point/line mesh at the 12 o'clock position. As a result of the pitch mismatch between the chain and sprocket, roller 128 must move to a new position. In particular, as roller 130 moves from initial contact to full mesh, roller 128 progresses forward in its tooth space. Small clearances in the chain joints, however, reduce the amount of forward progression required for roller 128. Also occurring at the onset of meshing is the beginning of the taut strand load transfer from roller 128 to roller 130.

The asymmetrical profile provides for the previously described "staged" meshing. In particular, referring again to FIG. 14, the Point A tangential contact occurs at the onset of mesh, with its related impact force $F_{IA}$. The roller 130 is believed to stay in hard contact with the engaging flank 134 as the sprocket rotation moves the roller into full mesh with its resulting radial contact at Point C. The radial impact force $F_{IC}$ (force vector shown as an outline) does not occur until the sprocket has rotated sufficiently to bring roller 130 into radial contact at Point C.

Figure 14B:
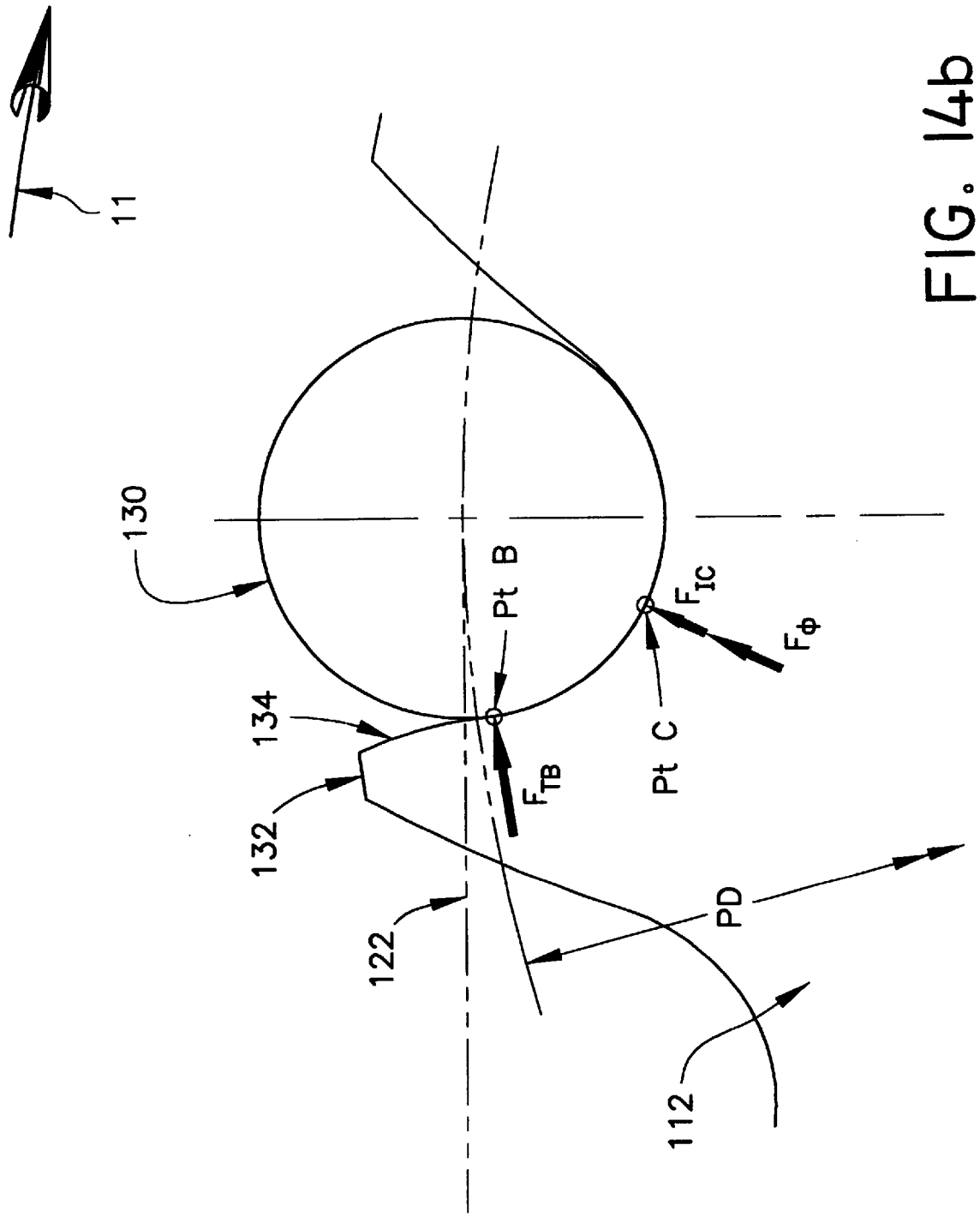
FIG. 14b is an enlarged view of the drive sprocket of FIG. 14 rotated in a clockwise direction to advance the second roller to the instant of full mesh at a 12 o'clock position.

FIG. 14b is an enlarged view of FIG. 14, except that sprocket 112 has been rotated to advance roller 130 to the instant of full mesh at the 12 o'clock position. At this instant of full mesh, the radial impact force $F_{IC}$ occurs and the taut strand load transfer is considered to be complete. At the instant of the radial collision by roller 130 at Point C, with its resultant radial impact force $F_{IC}$, the tangential impact force of $F_{IA}$ has already occurred and is no longer a factor. The time delay ("staged" engagement) between the tangential and radial roller-sprocket collisions effectively spreads the roller sprocket meshing impact energy over a greater time interval, thereby reducing its contribution to the generated noise level at mesh frequency. Additionally, it is believed that the present asymmetrical sprocket tooth profile beneficially permits a more gradual taut strand load transfer from a fully engaged roller 128 to a meshing roller 130 as the meshing roller 130 moves from its Point A initial mesh to its full two-point mesh position.

Referring again to FIG. 14, the chordal rise (and fall) with the present asymmetrical profile is the perpendicular displacement of the center of roller 130 from the taut strand 122 path as it moves from its initial meshing contact Point A to the mesh position presently occupied by roller 128. It is believed that roller 130 will stay in hard contact with the engaging flank 134 as the roller moves from initial tangential contact to full mesh, and accordingly, the chordal rise is reduced as the distance between Points A and B is increased. As shown in FIG. 14, chain pitch $P_c$ is beneficially greater than sprocket 112 chordal pitch $P_s$.

Figure 15:
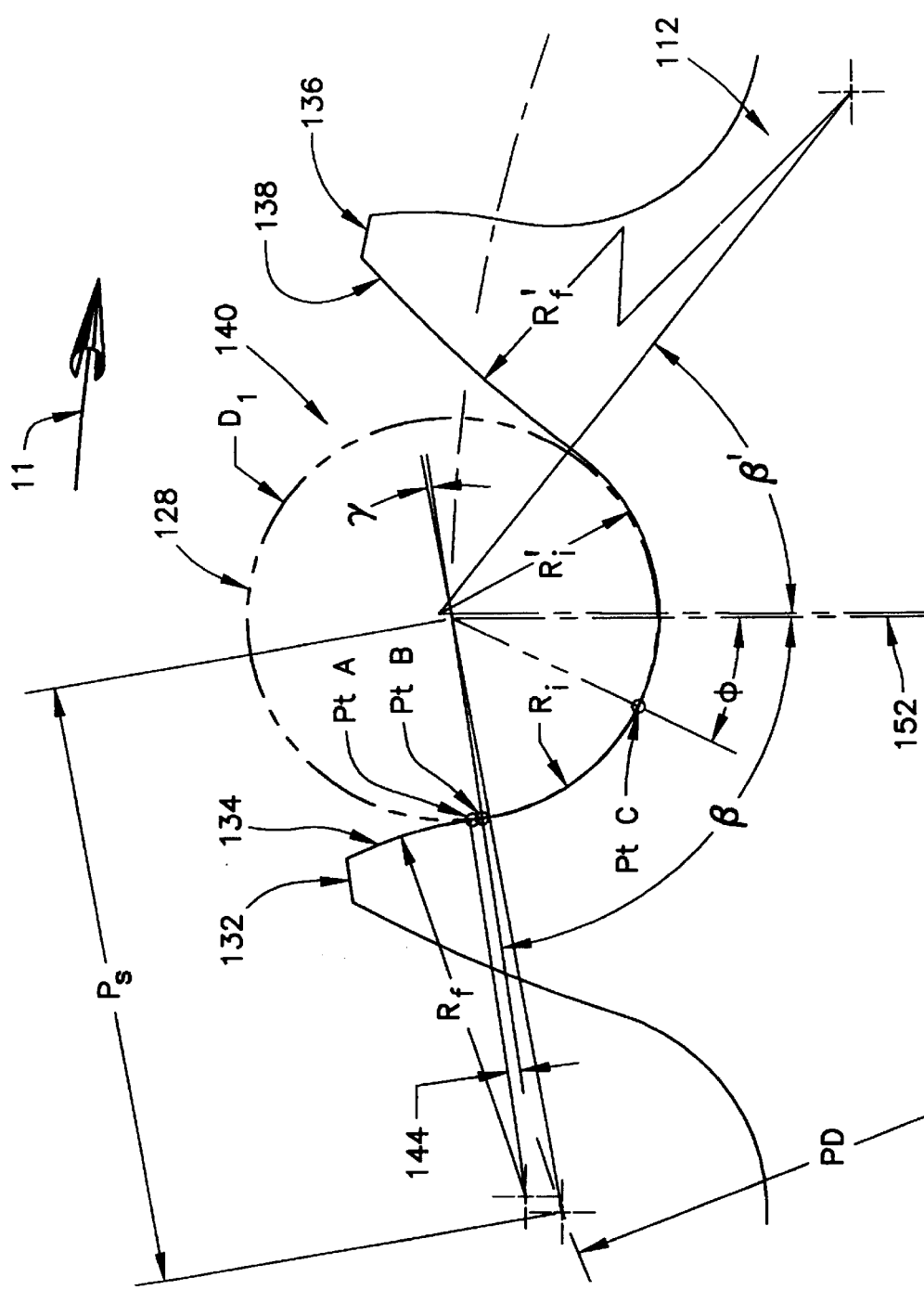
FIG. 15 illustrates a roller chain drive sprocket with an asymmetrical tooth space form in accordance with a second embodiment of the present invention.

Referring now to FIG. 15, the length of the inclined root surface 146 (FIG. 10) may be reduced to zero (0), thereby eliminating the inclined root surface 146 and permitting root radius $R_i'$ to be tangent to the root surface and the roller 142 at Point C. That is, $R_i'$ is tangent to a short flat at Point C, and the flat is tangent to $R_i$. If the inclined root surface 146 is eliminated, the engaging flank pressure angle γ would generally be in the range of some positive value to zero, but normally not less than zero. The reason is that a negative γ requires chordal pitch reduction so that the roller 60 can exit the sprocket wrap 60 (see FIGS. 16 and 17) without interfering with $R_f$.

Figure 16:
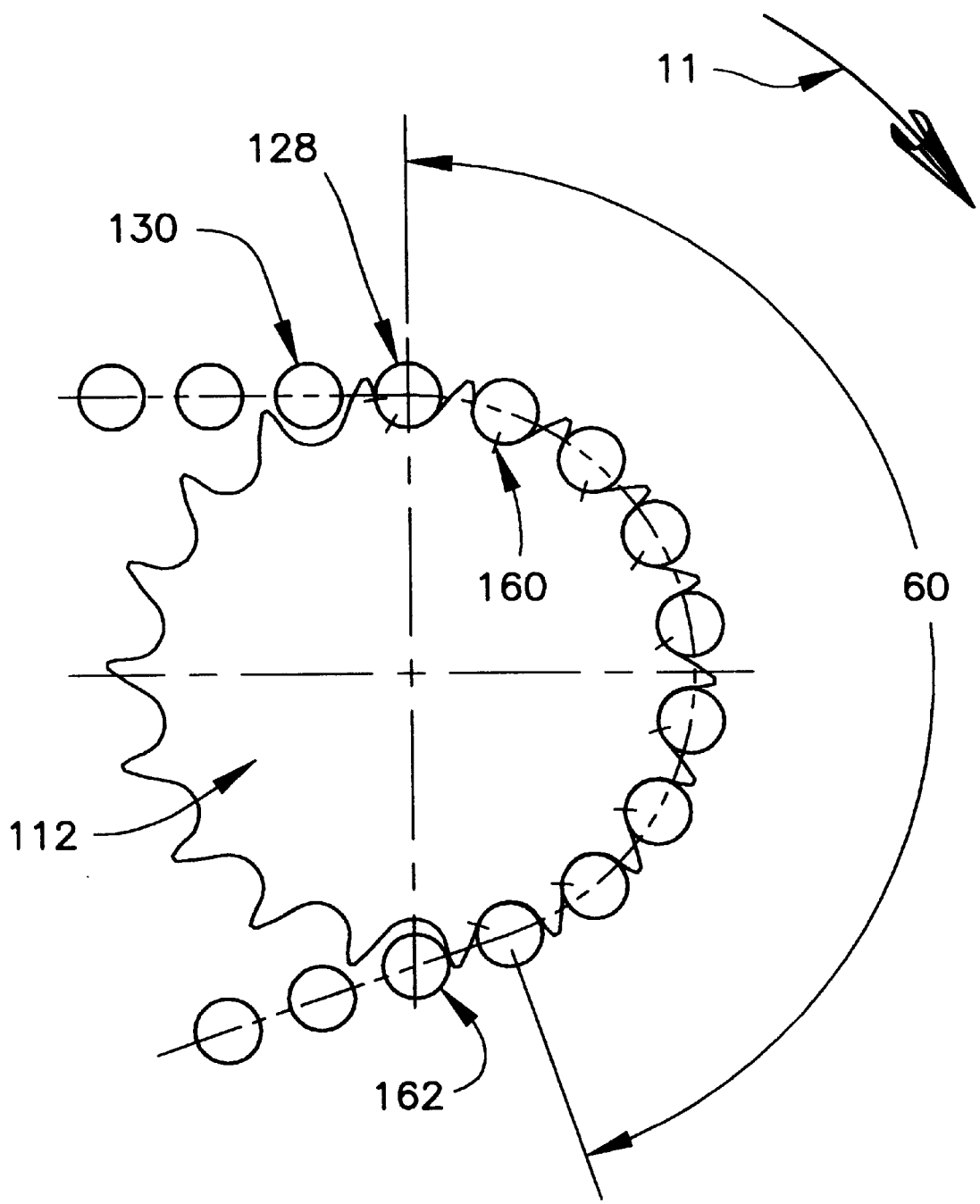
FIG. 16 is an enlarged view of FIG. 8, showing the contact progression as the rollers travel around the drive sprocket wrap.

FIG. 16 shows the roller contact to the sprocket 112 profile for all the rollers in the wrap 60. Roller 128 is in full two-point mesh as shown. Line 160 shows the contact point for each of the rollers, as well as the contact progression as the rollers travel around the wrap. The inherent pitch mismatch between the sprocket and roller chain causes the rollers to climb up the coast side flank as the rollers progress around the sprocket wrap. With the addition of appreciable chordal pitch reduction, the extent to which the rollers climb up the coast side flank in increased.

Figure 17:
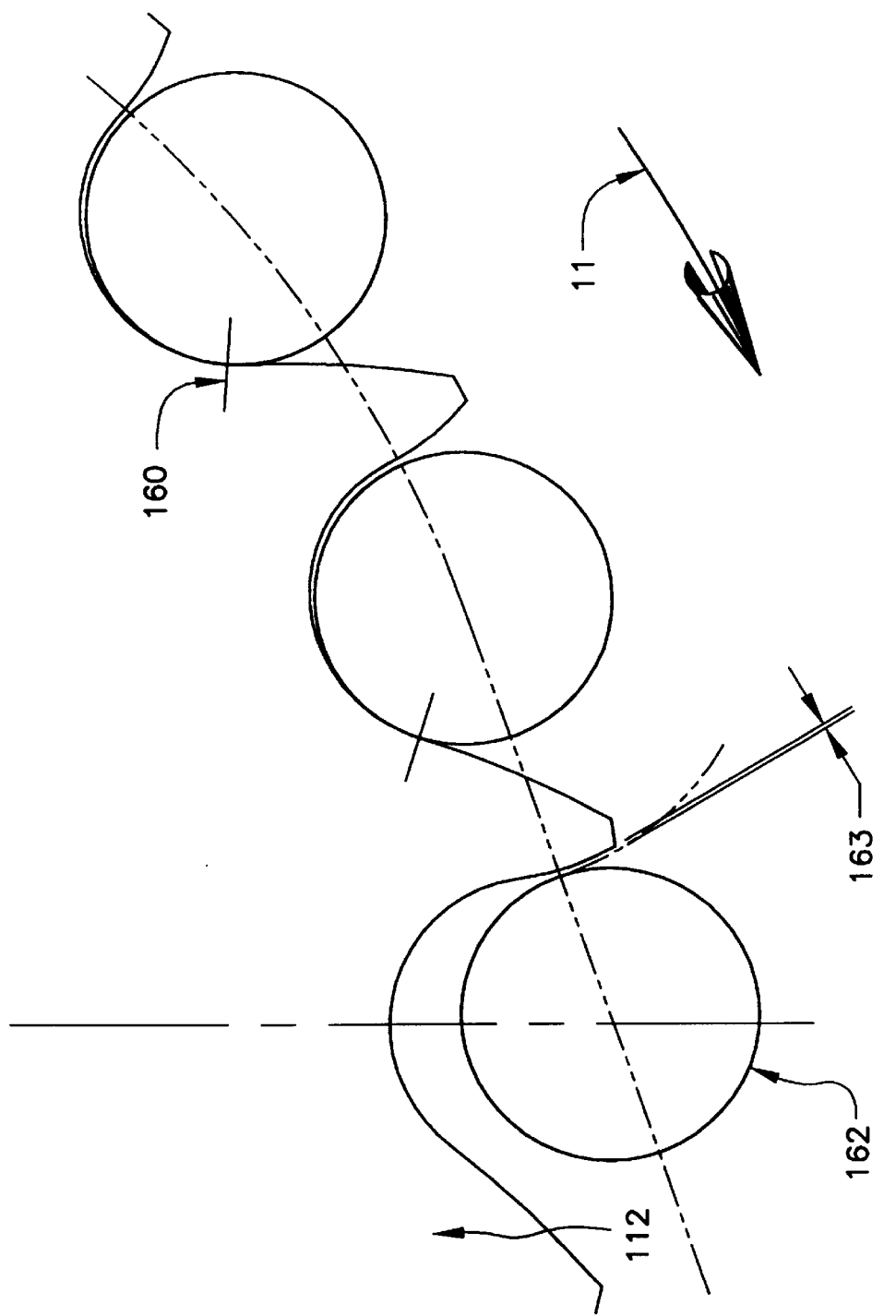
FIG. 17 is an enlarged view of a roller exiting a sprocket wrap of the sprocket of FIG. 8.

It is important to note that chordal pitch reduction is required when the pressure angle γ has a negative value. Otherwise, as shown in FIGS. 16 and 17, roller 162 would interfere with the engaging flank (with a maximum material sprocket and a theoretical pitch [shortest] chain) as it exits the wrap 60 back into the span. Also, the reduced chordal pitch assists the staged mesh as previously mentioned. FIG. 16, showing the roller contact progression in the wrap 60, serves also to show why the shallow β' angle and tooth space clearance TSC helps maintain "hard" roller-sprocket contact for the rollers in the wrap.

In addition, the disengaging flank roller seating angle β' (FIG. 9) may be adjusted to have a maximum value which is equal to $\alpha_{min}/2$ or even less. This reduced seating angle β' promotes faster separation when the roller leaves the sprocket and enters the span. This reduced angle β' also allows for the roller in a worn chain to ride up the coast flank surface to a less severe angle as the roller moves around the sprocket in the wrap. Accordingly, chordal pitch reduction, if used in this embodiment, should be a small value.

It is contemplated that the above-described asymmetrical tooth profile features can be altered without substantially deviating from the chain and sprocket meshing kinematics that produce the noise reduction advantages of the present invention. For example, the engaging asymmetrical flank profile could be approximated by an involute form, and the disengaging asymmetrical flank profile could be approximated by a different involute form. Slight changes to the asymmetrical tooth profiles may be made for manufacturing and/or quality control reasons, or simply to improve part dimensioning. These changes are within the scope of the invention as disclosed herein.

Figure 18:
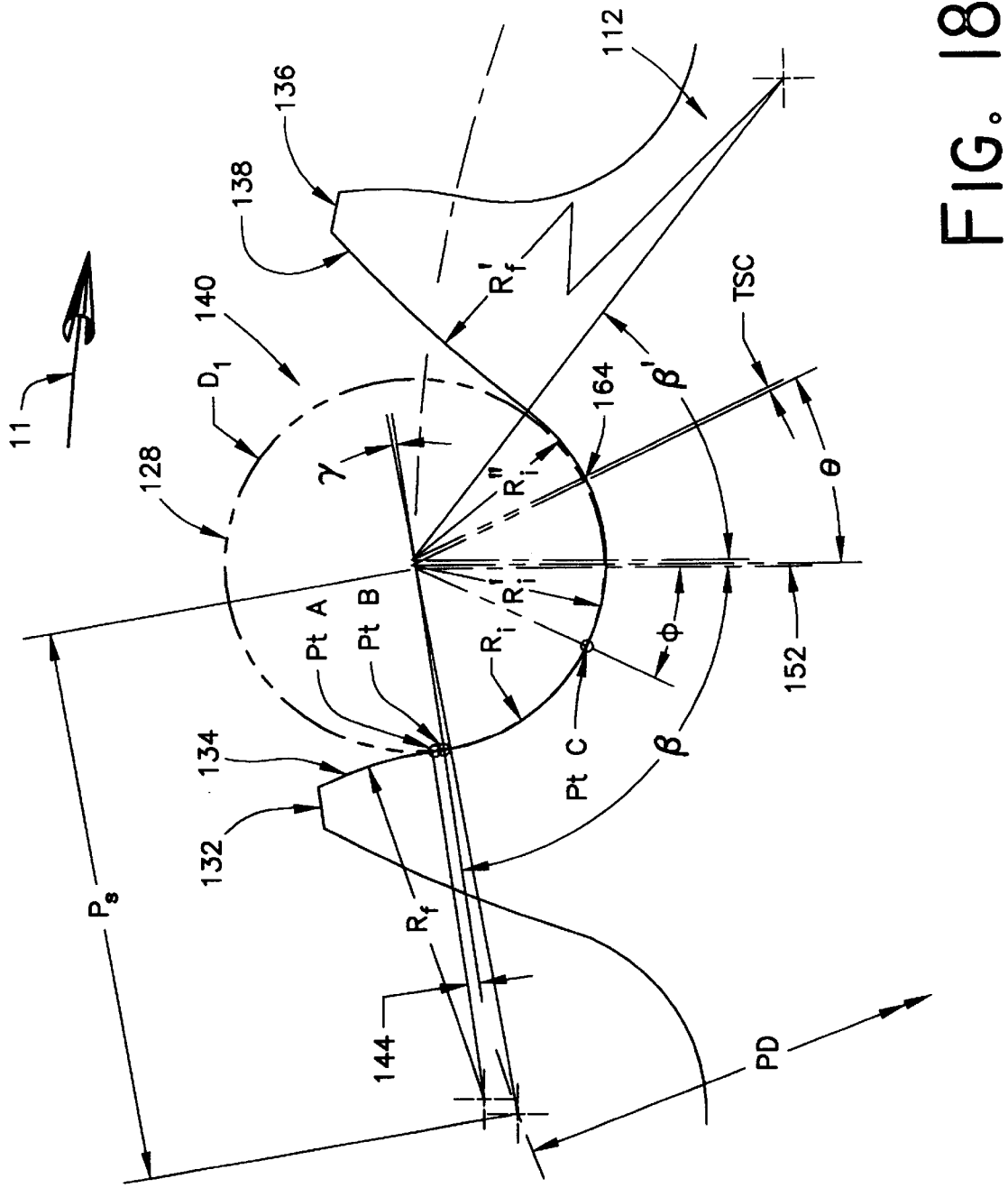
FIG. 18 illustrates a roller chain sprocket with an asymmetrical tooth space form in accordance with a third embodiment of the present invention.

In a further embodiment, the engaging flank inclined root surface 146 (FIG. 9) may be replaced with a coast flank inclined root surface 164 as shown in FIG. 18. The coast flank inclined root surface 164 provides tooth space clearance (TSC) in the same manner as described above with regard to the inclined root surface 146. In addition, the disengaging flank inclined root surface 164 beneficially moves the roller to a preferred radially outward position as the chain wears.

Figure 19:
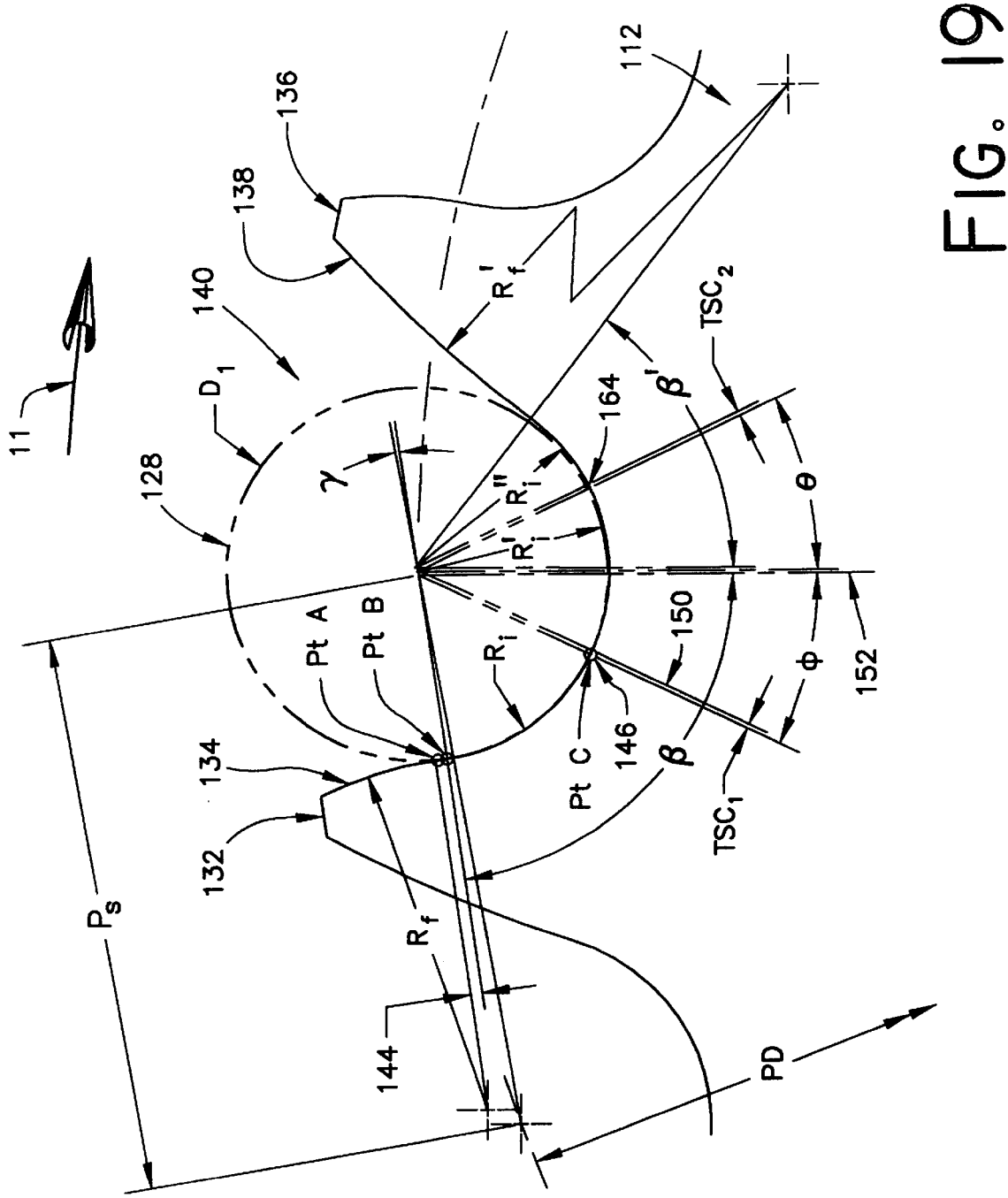
FIG. 19 illustrates a roller chain sprocket with an asymmetrical tooth space form in accordance with a fourth embodiment of the present invention.

Alternatively, the disengaging flank inclined root surface 164 may be included with the engaging flank inclined root surface 146 as shown in FIG. 19. The engaging flank and disengaging flank inclined root surfaces 146, 164 cooperate to provide tooth space clearance (TSC) in the same manner as previously described.

Figure 20:
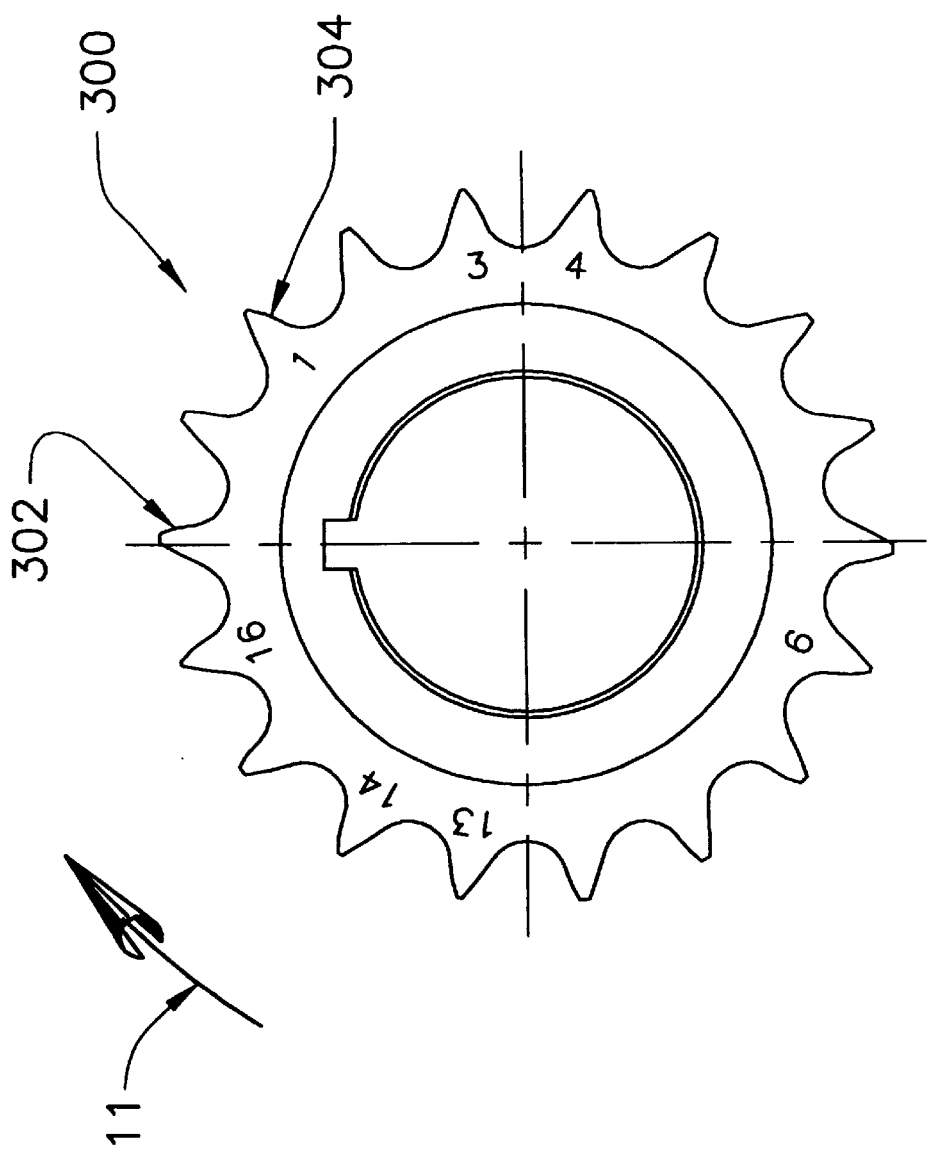
FIG. 20 is a side view of an exemplary random-engagement roller chain sprocket which incorporates the features of the present invention therein.

Referring now to FIG. 20, any one of the above-described asymmetrical tooth profile embodiments of FIGS. 9, 15, 18, and 19 may be incorporated into a random-engagement roller chain sprocket 300. The sprocket 300 is shown as an 18-tooth sprocket. However, the sprocket 300 may have more or less teeth, as desired. The sprocket 300 includes a first group of arbitrarily positioned sprocket teeth 302 each having a profile which incorporates the flank flat 144 shown in FIGS. 9, 15, 18 and 19. In order to facilitate describing the random engagement roller chain sprocket, reference will be made to the sprocket teeth 302 having the tooth profiles shown in FIGS. 9 and 15. However, the sprocket teeth 302 may equally incorporate the tooth profiles shown in FIGS. 18 and 19. The remaining sprocket teeth 304 (sprocket teeth 1, 3, 4, 9, 13, 14, and 16) are randomly positioned around the sprocket and incorporate a tooth profile different from that of the first group of sprocket teeth 302. As described further below, the first and second groups of sprocket teeth 302, 304 cooperate to reduce chain drive system noise levels below a noise level which either tooth profile used alone would produce.

Figure 21:
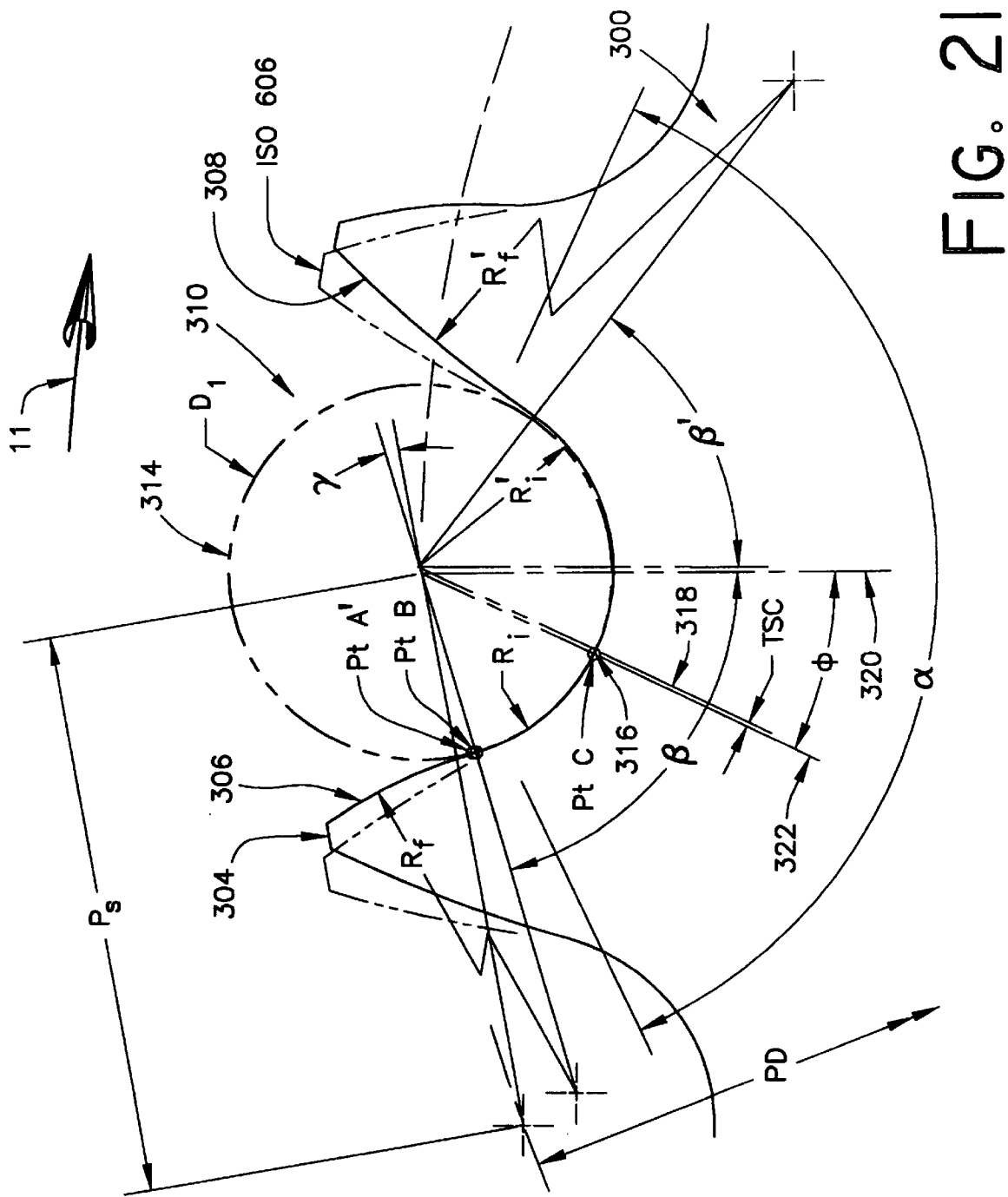
FIG. 21 illustrates the random-engagement roller chain sprocket of FIG. 20 with an additional asymmetrical tooth space form in accordance with the present invention.

FIG. 21 illustrates an exemplary tooth profile for one of the sprocket teeth 304. An engaging flank 306 and a coast or disengaging flank 308 of an adjacent tooth cooperate to define a tooth space 310 which receives an engaging roller 314 (shown in phantom). The engaging roller 314 has a roller diameter $D_r$, and is shown fully seated in two-point contact within the tooth space 310. The engaging roller 314 initially contacts the engaging flank 306 at point A' before fully seating in the tooth space at points B' and C. Contact points B' and C are actually lines that extend axially along each sprocket tooth surface (i.e., in a direction orthogonal to the plane of the drawings).

The engaging flank 306 has a radius $R_f$ which is tangent to a flat surface (not shown) at contact point B'. The flat surface, which functions only to facilitate the two-point roller contact (described further below), is normal to the roller 314 at point B'. The flat extends radially inward from point B' and is tangent to a first root radius $R_i$. The first root radius $R_i$ may be tangent to a radially outer end of an inclined root surface 316. A maximum root radius $R_i$ must be equal to, or less than, a minimum roller radius to facilitate the fully engaged two-point/line contact at points B' and C. Accordingly, a small clearance is defined between the root radius $R_i$ and the roller 314 when the roller 314 is fully seated at points B' and C. The flat surface and the inclined root surface 316 necessarily extend inside contact points B' and C, respectively, to facilitate the two-point/line roller contact at engagement. A second root radius $R_i'$ is tangent to a radially inner end of the inclined root surface 316 at line 318. The disengaging flank has a radius $R_f'$ at a point defined by the roller seating angle β'.

The inclined root surface 316 is a flat surface having a finite length which defines a tooth space clearance (TSC). The tooth space clearance compensates for chain pitch elongation or chain wear by accommodating a specified degree of chain pitch elongation. In other words, the tooth space clearance TSC enables rollers of a worn chain to be maintained in hard contact with the inclined root surface of the sprocket teeth. In addition, the inclined root surface 316 facilitates reducing the radial reaction force thereby reducing the roller radial impact noise contribution to the overall noise level.

The inclined root surface 316 may be inclined at any angle φ necessary to satisfy a specific chain drive geometry and chain pitch elongation. The inclined root surface angle φ is measured from a line 320 passing through the center of roller 314 and the sprocket center to a second line 322 which also passes through the center of roller 314 and through contact point C. The inclined root surface 316 is normal to the line 322, and the inclined root surface extends radially inward to line 318 where it is tangent to $R_i'$. In the embodiment being described, the inclined root surface angle φ is preferably in the range of about 20° to about 35° In sum, the tooth profile for the sprocket teeth 304 may be substantially the same as the tooth profile shown in FIGS. 9 and 15 except that the tooth profile 304 does not have an engaging flank flat extending above (i.e. radially outward of) contact point B'.

As with the tooth profile of FIGS. 9 and 15, the engaging flank inclined root surface 316 may be replaced with a disengaging flank inclined root surface as in FIG. 18. That is, the tooth profile 304 may be substantially identical to the sprocket 112 shown in FIG. 18 from contact point C to the outer diameter of the disengaging flank 308. The disengaging flank inclined root surface provides tooth space clearance (TSC) in the same manner as the inclined root surface 316. In addition, the coast flank inclined root surface beneficially moves the roller to a preferred radially outward position as the chain wears. Alternatively, the disengaging flank inclined root surface may be included with the engaging flank inclined root surface 316 as in FIG. 19. Thus, the tooth profile 304 may be substantially identical to the sprocket 112 shown in FIG. 19 from contact point C to the outer diameter of the coast flank 138.

Pitch mismatch is inherent in a chain/sprocket interface except at one condition—the theoretical condition which is defined as a chain at its shortest pitch (shortest being theoretical pitch) and a maximum material sprocket. This theoretical condition therefore defines one limit (zero, or no pitch mismatch) of the tolerance range of the pitch mismatch relationship of chain and sprocket. The other limit is defined when a longest "as built" chain is used with a sprocket at minimum material conditions—or in other words, a sprocket having a minimum profile. This limit produces the greatest amount of pitch mismatch. The pitch mismatch range is therefore determined by the part feature tolerances.

Additional pitch mismatch may be introduced to facilitate a greater time delay between tangential contact at point A (for tooth profile 302) and tangential contact at point A' (for tooth profile 304). That is, varying the time at which roller-to-sprocket contact occurs for each tooth profile 302, 304 results in reduced mesh frequency noise because the point and rhythm of the initial roller-to-sprocket contact is altered. The time delay between the roller-to-sprocket contact at points A and A' may be increased by increasing the mismatch between the chain pitch and sprocket pitch.

Additional pitch mismatch may also be introduced to facilitate a "staged" roller contact for each tooth profile 302, 304. That is, additional pitch mismatch increases the time delay between initial tangential contact and the fully seated radial contact for each tooth profile 302, 304. It should be appreciated that staged contact is greater for the tooth profile 302 than for the tooth profile 304 due to the flank flat 144 which causes initial contact to occur higher up on the engaging flank of the sprocket teeth 302.

The sprocket chordal pitch is necessarily shorter than the chain pitch to facilitate the "staged" roller-tooth contact. In addition, chordal pitch reduction also provides roller-to-flank clearance as the roller exits the sprocket wrap back into the strand. Added chordal pitch reduction, when used, is preferably in the range of 0.005–0.030 mm.

Figure 22:
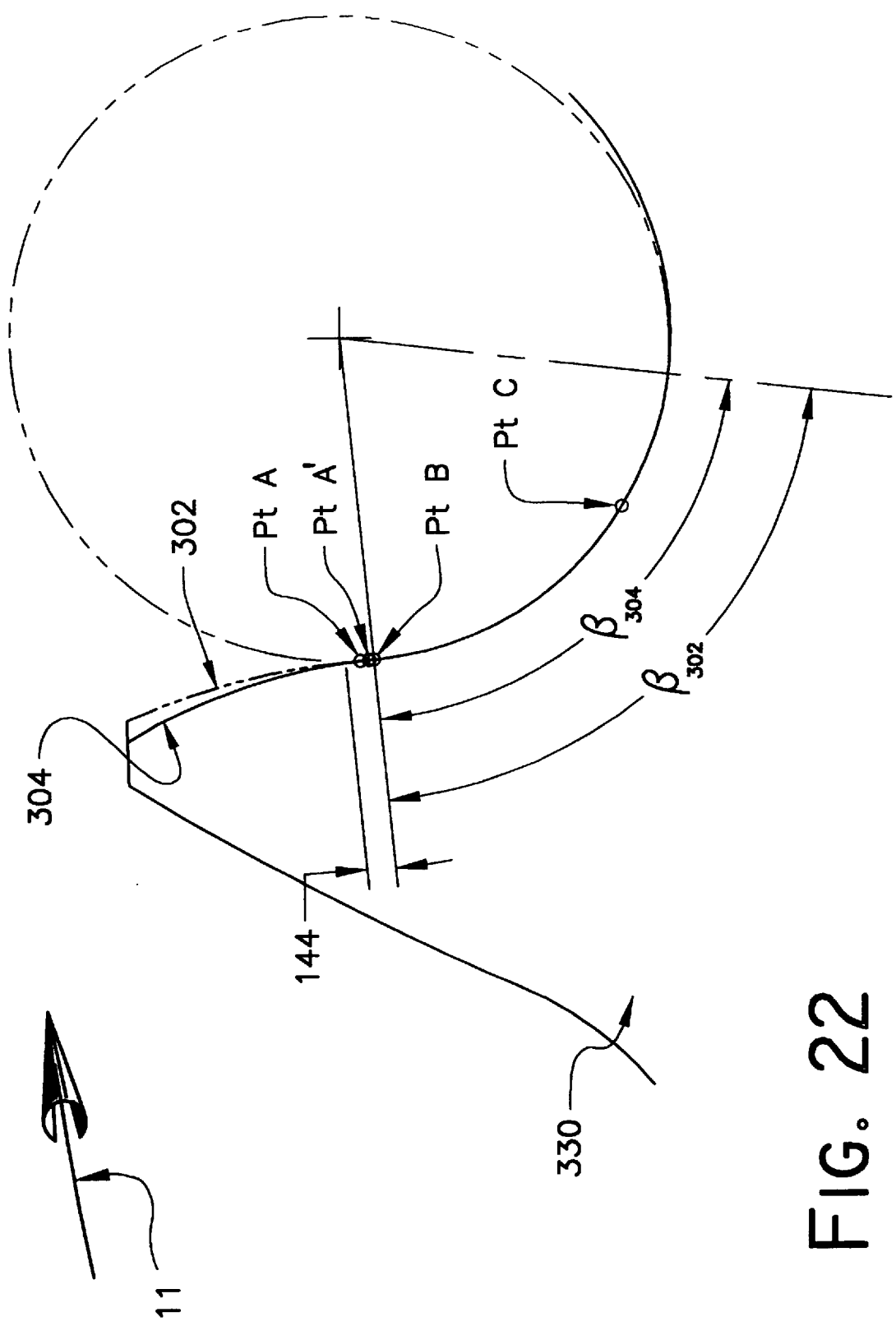
FIG. 22 illustrates the asymmetrical tooth space form of FIG. 9 overlaid with one embodiment of the asymmetrical tooth space form of FIG. 21.

The staged roller contact for each tooth profile 302, 304 may be further assisted by providing sprocket tooth pressure angles $\gamma$ that are substantially less than the ISO standard. Pressure angles $\gamma$ equal to or very close to zero (0), or even negative pressure angles, are contemplated. For instance, FIG. 22 illustrates one embodiment of a random engagement sprocket 330 wherein the tooth profiles 302, 304 have the same, or at least substantially the same, pressure angles $\gamma$ (thus, the profiles 302, 304 have the same or at least substantially the same roller seating angles $\beta_{302}$ and $\beta_{304}$). In FIG. 22, the pressure angle for both profiles 302, 304 is zero or a positive value. Thus, $\gamma_{min}$ for both profiles 302, 304 may be 0°, and $\gamma_{max}$ for both profiles 302, 304 is equal to some value less that the ISO minimum pressure angle $\gamma$. As a result, initial roller-to-sprocket contact occurs at point A followed by subsequent radial contact at points B and C for the tooth profile 302 of sprocket 330. And, initial roller-to-sprocket contact occurs at point A' followed by subsequent radial contact at points B and C for the tooth profile 304 of sprocket 330. The sprocket 330 may, or may not incorporate additional chordal pitch reduction, and may, or may not incorporate tooth space clearance (TSC), as described above.

Figure 23:
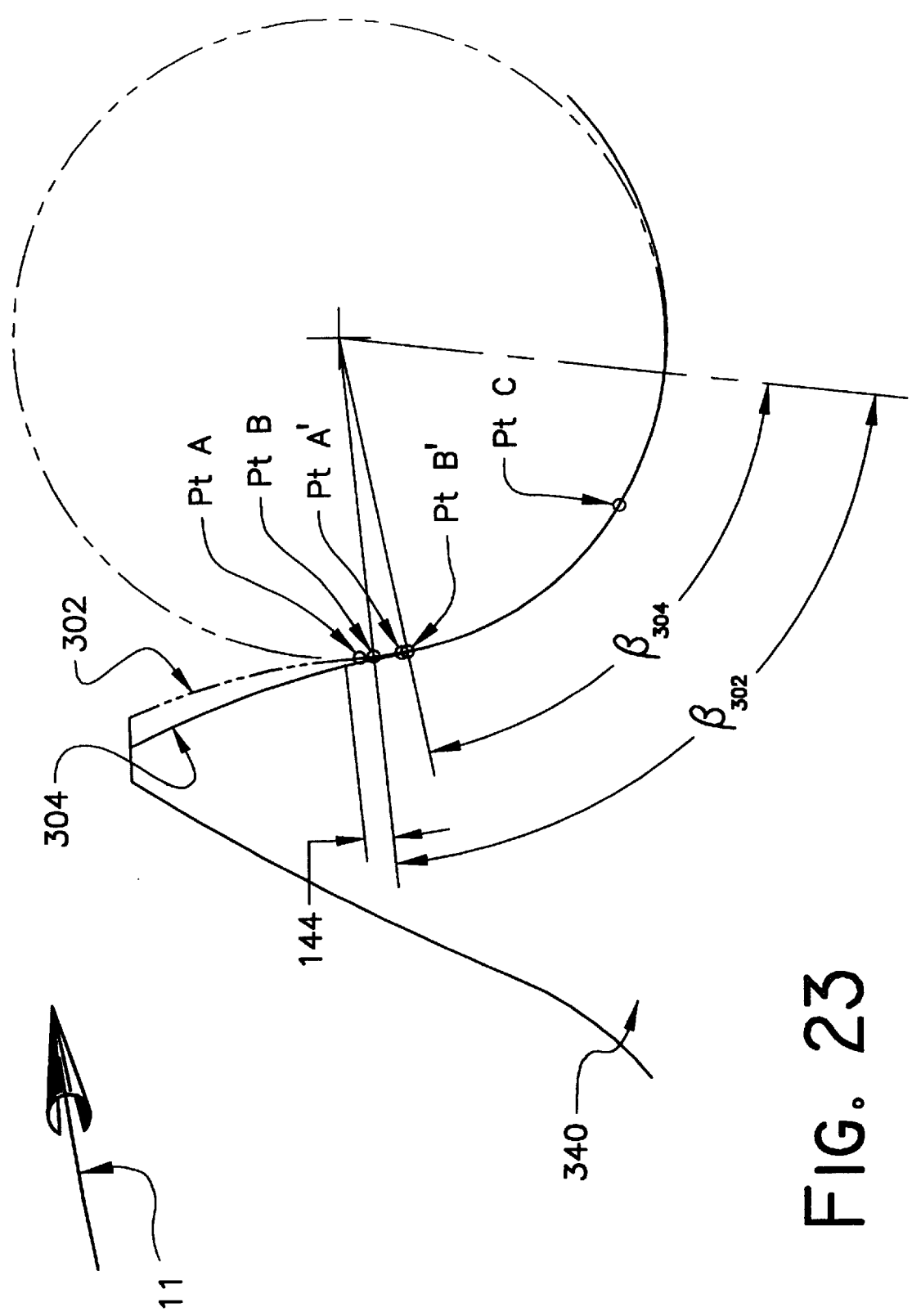
FIG. 23 illustrates the asymmetrical tooth space form of FIG. 9 overlaid with a second embodiment of the asymmetrical tooth space form of FIG. 21.

With reference to FIG. 23, a second embodiment of a random engagement sprocket 340 is shown wherein the pressure angles $\gamma$ for the tooth profiles 302, 304 are different. That is, both pressure angles $\gamma$ are either a positive value or zero, but the pressure angle $\gamma$ for tooth profile 302 is smaller than the pressure angle $\gamma$ for tooth profile 304 (and the roller seating angle $\beta_{302}$ is greater than the roller seating angle $\beta_{304}$) Thus, $\gamma_{min}$ may be equal to 0° for the tooth profile 302, $\gamma_{min}$ may be equal to +4° for the tooth profile 304, and $\gamma_{max}$ for both profiles 302, 304 will always be less than the ISO minimum pressure angle (the feature tolerance band or range for $\gamma_{min}$ and $\gamma_{max}$ is the same for both tooth profiles 302, 304). As a result, initial roller-to-sprocket contact occurs at point A followed by subsequent radial contact at points B and C for the tooth profile 302 of sprocket 340. And, initial roller-to-sprocket contact occurs at point A' followed by subsequent radial contact at points B' and C for the tooth profile 304 of sprocket 340. The sprocket 340 may or may not incorporate additional chordal pitch reduction, and may or may not incorporate tooth space clearance (TSC), as desired.

Alternatively, the pressure angle $\gamma_{min}$ for the profile 302 may always be a negative value, while the pressure angle $\gamma_{min}$ for profile 304 may always be a positive value or zero. For instance, $\gamma_{min}$ may be equal to −30 for the tooth profile 302, $\gamma_{min}$ may be equal to +3° for the tooth profile 304, and $\gamma_{max}$ for both profiles 302, 304 will always be less than the ISO minimum pressure angle. With this embodiment, additional chordal pitch reduction will always be included, however, tooth space clearance may or may not be included.

Figure 24:
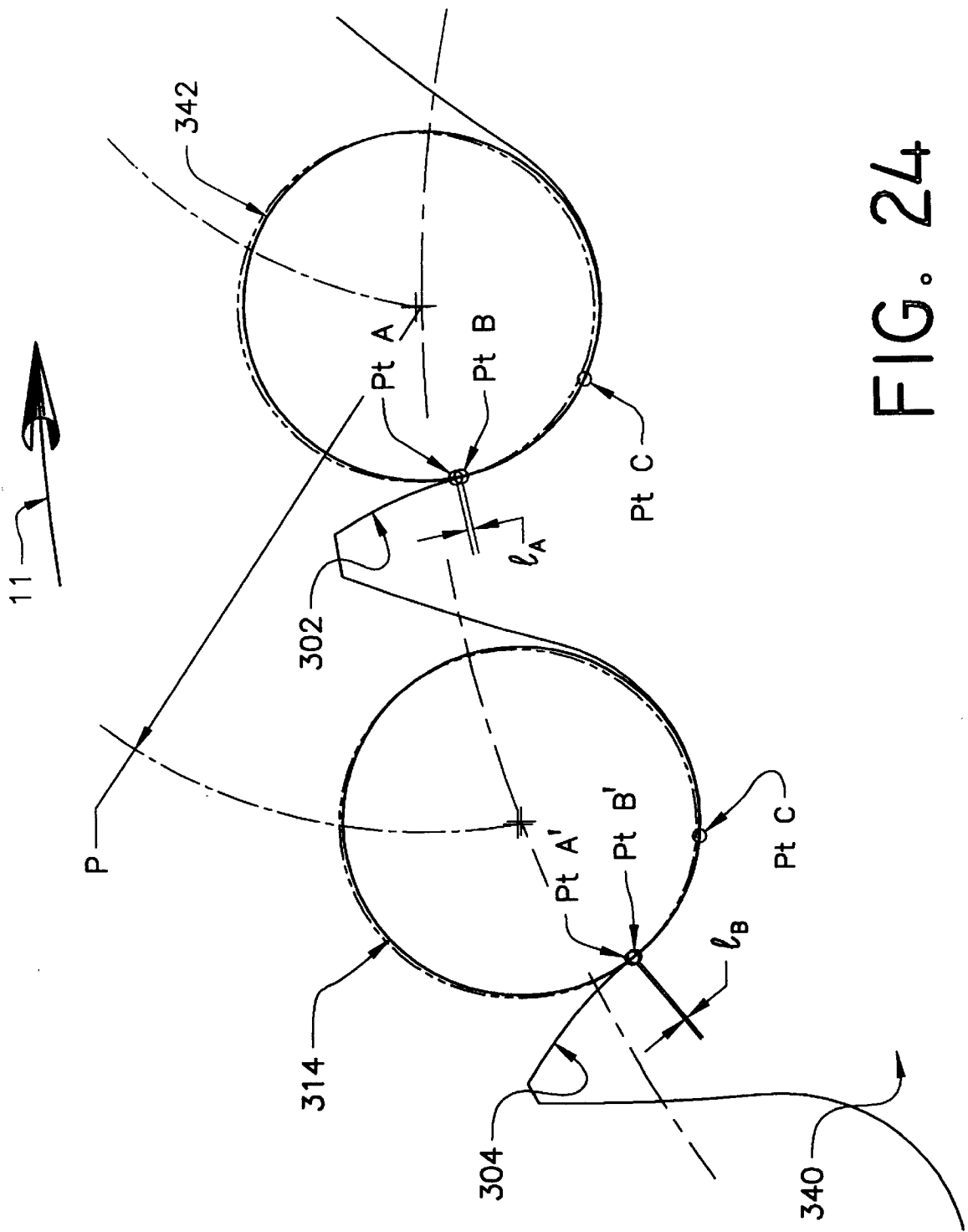
FIG. 24 illustrates the progression of a first and a second roller as the random-engagement roller chain sprocket of FIG. 20 is rotated in a clockwise direction.

FIG. 24 shows the engagement path of a roller 342 fully seated in the sprocket tooth 302, and an engagement path of the roller 314 engaging the adjacent sprocket tooth 304 of the sprocket 340. At the instant of initial contact for roller 314, the chain load transfer from roller 342 to roller 314 begins, until at full engagement, roller 314 will substantially carry the full chain load. Also, as roller 314 moves from initial contact to full mesh, roller 342 will progress forward in its tooth space. Small clearances in the chain joints, however, will reduce the amount of forward progression required for Roller 342. Since impact energy is reduced with this profile geometry, the load transfer is more gradual than with the standard ISO profile.

The references $l_A$ and $l_B$ (in FIG. 24 serve to show the amount of "staging" for each profile from the initial contact to the two-point contact at full mesh. The reference $l_A$ indicates the linear distance separating the initial contact point A from the contact point B for the profile 302, and the reference $l_B$ indicates the linear distance separating the initial contact point A' from the contact point B' for the profile 304. The value $l_A - l_B$ is a measure of the initial (tangential) contact time delay from profile 304 to profile 302, which is illustrated further in FIGS. 25 and 26. The time delay beneficially increases with chain wear for the embodiment incorporating different pressure angles (FIG. 23) in that the tooth profile 304 "falls away" faster than does the tooth profile 302. The delay increases with increasing chain pitch or pitch mismatch.

Figure 25:
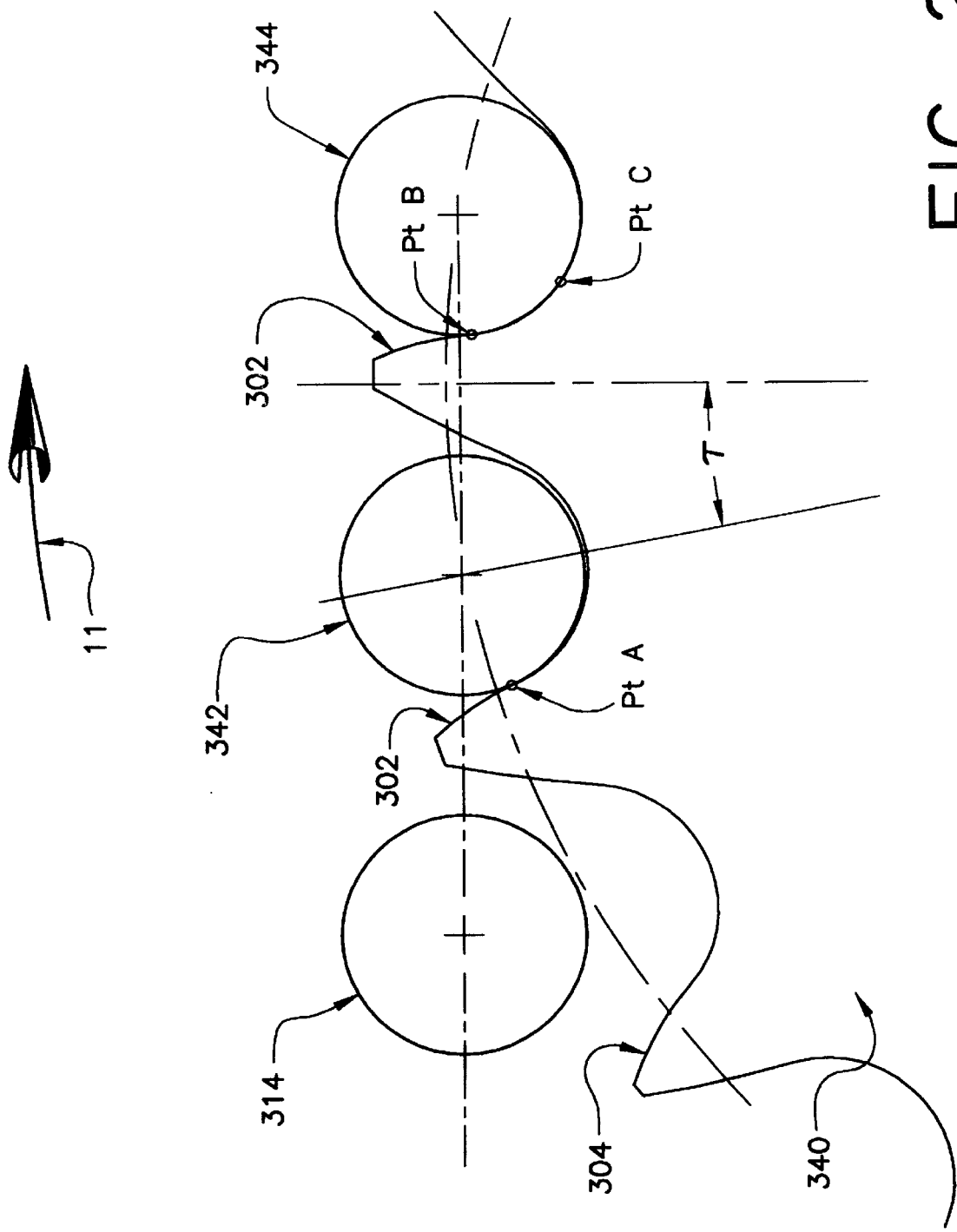
FIG. 25 illustrates the sprocket of FIG. 23 with a first roller in two-point contact, a second roller at initial tangential contact, and a third roller about to mesh with the drive sprocket.

FIGS. 25 and 26 illustrate the meshing delay between the tooth profiles 302, 304. In particular, as shown in FIG. 25, the sprocket 340 has a roller 344 fully-seated in two-point contact with a sprocket tooth incorporating the tooth profile 302. The roller 342 is shown at the instant of initial tangential contact at point A of a second sprocket tooth also incorporating the tooth profile 302. The roller 314 is the next roller in the span and will mesh with a sprocket tooth incorporating the tooth profile 304. The sprocket 340 must rotate through an angle τ for roller 342 to move from its initial contact position at point A to full mesh, seated in two-point contact with the tooth profile 302 at a 12 o'clock position.

With reference now to FIG. 26, the sprocket 340 is shown rotated in a clockwise direction until roller 314 is at the instant of initial tangential contact at point A' of the tooth profile 304. The sprocket 340 must now rotate through a smaller angle κ for roller 314 to fully seat in two-point contact with the tooth profile 304 at a 12 o'clock position. That is, the staged contact for the tooth profile 302 is greater than for the tooth profile 304 due to the flank flat 144 as well as the difference in engaging side roller seating angles $\beta_{302}$ and $\beta_{304}$ which cause initial contact to occur higher up on the engaging flank of the sprocket teeth 302. Thus, the sprocket 340 must rotate through an additional angle τ-κ in order for the roller to fully seat.

As shown in FIG. 20, the two sets of tooth profiles 302, 304 are arranged in a random pattern in order to modify the meshing impact frequency by altering the point and rhythm of initial roller-to-sprocket contact. However, the two sets of tooth profiles 302, 304 could be arranged in many different random patterns. Further, it is also contemplated that the two sets of tooth profiles 302, 304 could be arranged in many regular patterns that would work equally as well. In all cases, the arrangement of two sets of different tooth profiles on a sprocket provides a means for breaking up the mesh frequency impact noise normally associated with and induced by a full complement of substantially identically shaped sprocket teeth. The mesh frequency noise reduction is achieved by altering the point and rhythm of initial roller-to-sprocket contact.

The crankshaft sprocket, generally the smallest sprocket in the chain drive, is usually the major noise contributor. The typically larger driven camshaft sprocket, however, will also contribute to the generated noise levels, but generally to a lesser extent than the crankshaft sprocket. However, the driven sprocket, particularly if it is nearly the same size or smaller than the driving sprocket, may be the prime noise generator, as in the case with balance shaft sprockets and pump sprockets. Thus, the features of the present invention may also be used advantageously with camshaft or driven sprockets as well.

It should be appreciated that the tooth profile features of FIGS. 20–26 can be altered slightly without substantially deviating from the chain and sprocket meshing kinematics that produce the noise reduction advantages of the present invention. For example, the engaging asymmetrical flank profile could be approximated by an involute form, and the disengaging asymmetrical flank profile could be approximated by a different involute form. Slight changes to the profile may be done for manufacturing and/or quality control reasons —or simply to improve part dimensioning.

The invention has been described with reference to the preferred embodiments. Obviously, modifications will occur to others upon a reading and understanding of this specification and this invention is intended to include same insofar as they come within the scope of the appended claims or the equivalents thereof.

Having thus described the preferred embodiments, the invention is now claimed to be:

1. A sprocket comprising:
    a first plurality of sprocket teeth each having a first engaging side tooth profile including a first engaging flank, a first root radius, and a flank flat, a radially outer end of the flank flat being tangent to the first engaging flank and a radially inner end of the flank flat being tangent to the first root radius;
    a second plurality of sprocket teeth each having a second engaging side tooth profile different from the first engaging side tooth profile, the second engaging side tooth profile including a second engaging flank and a second root radius tangent to a radially inner end of the second engaging flank; and
    the sprocket being adapted for stared meshing with an associated roller chain having a plurality of rollers wherein a first roller of the associated roller chain impacts one of the plurality of first sprocket teeth at a first contact point along the first engaging side tooth profile and wherein a second roller of the associated roller chain impacts one of the plurality of second sprocket teeth at a second contact point along the second engaging side tooth profile spaced from the first contact point.

2. The sprocket of claim 1, wherein the first contact point is positioned radially outward of the second contact point.

3. The sprocket of claim 1, further including an engaging side inclined root surface tangent to at least one of said first engaging side root radius and said second engaging side root radius.

4. The sprocket of claim 3, wherein said first plurality of sprocket teeth further include a first disengaging side tooth profile having a first disengaging side root radius, said second plurality of sprocket teeth further include a second disengaging side tooth profile having a second disengaging side root radius, and a disengaging side inclined root surface tangent to at least one of said first disengaging side root radius and said second disengaging side root radius.

5. The sprocket of claim 3, wherein said first engaging side root radius and said second engaging side root radius are both less that a roller radius.

6. The sprocket of claim 1, wherein said first plurality of sprocket teeth include a first disengaging side tooth profile having a first disengaging side root radius, said second plurality of sprocket teeth include a second disengaging side tooth profile having a second disengaging side root radius, and a disengaging side inclined root surface tangent to with at least one of said first disengaging side root radius and said second disengaging side root radius.

7. The sprocket of claim 1, wherein the associated roller chain has a predetermined chain pitch and the sprocket has a predetermined chordal pitch which is less than said chain pitch.

8. The sprocket of claim 1, wherein an engaging flank pressure angle (γ) of said first plurality of sprocket teeth is substantially the same as an engaging flank pressure angle (γ) of said second plurality of sprocket teeth.

9. The sprocket of claim 8, wherein a minimum engaging flank pressure angle ($\gamma_{min}$) of said first and said second plurality of sprocket teeth is greater than or equal to zero, and a maximum engaging flank pressure angle ($\gamma_{max}$) of said first and said second plurality of sprocket teeth is less than an ISO-606 minimum engaging flank pressure angle ($\gamma_{ISOmin}$).

10. The sprocket of claim 1, wherein
    a minimum engaging flank pressure angle ($\gamma_{min}$) of said first plurality of sprocket teeth is greater than or equal to zero,
    a minimum engaging flank pressure angle ($\gamma_{min}$) of said second plurality of sprocket teeth is greater than said minimum engaging flank pressure angle of said first plurality of sprocket teeth, and
    a maximum engaging flank pressure angle ($\gamma_{max}$) of said first and said second plurality of sprocket teeth is less than an ISO-606 minimum engaging flank pressure angle ($\gamma_{ISOmin}$).

11. The sprocket of claim 1, wherein
    a minimum engaging flank pressure angle ($\gamma_{min}$) of said first plurality of sprocket teeth is a negative value, a minimum engaging flank pressure angle ($\gamma_{min}$) of said second plurality of sprocket teeth is a positive value, and a maximum engaging flank pressure angle ($\gamma_{max}$) of said first and said second plurality of sprocket teeth is less than an ISO-606 minimum engaging flank pressure angle ($\gamma_{ISOmin}$).

12. The sprocket of claim 1, wherein the first plurality of sprocket teeth include a first disengaging side tooth profile, and the first engaging side tooth profile and the first disengaging side tooth profile cooperating to form asymmetrical tooth spaces for receiving the rollers of the associated roller chain, the asymmetrical tooth spaces being defined by an engaging side roller seating angle ($\beta$) that is greater than a disengaging side roller seating angle ($\beta'$).

13. A unidirectional roller chain drive system comprising:
a driving sprocket having sprocket teeth with engaging flanks and coast flanks, the engaging flanks cooperating with the coast flanks of adjacent teeth to define asymmetrical tooth spaces between the sprocket teeth;
a driven sprocket having sprocket teeth with engaging flanks and coast flanks, the engaging flanks cooperating with the coast flanks of adjacent teeth to define asymmetrical tooth spaces between the sprocket teeth;
a roller chain having rollers in engaging contact with the driving sprocket and the driven sprocket; and
at least one of said driving sprocket and said driven sprocket including:
a first plurality of sprocket teeth each having a first engaging side tooth profile including a first engaging flank, a first root radius, and a flank flat, a radially outer end of the flank flat being tangent to the first engaging flank and a radially inner end of the flank flat being tangent to the first root radius,
a second plurality of sprocket teeth each having a second engaging side tooth profile different from the first engaging side tooth profile, the second engaging side tooth profile including a second engaging flank, and
the at least one of said driving sprocket and said driven sprocket being adapted for staged meshing with the roller chain wherein a first roller of the roller chain impacts one of the plurality of first sprocket teeth at a first contact point along the first engaging side tooth profile and wherein a second roller of the roller chain impacts one of the plurality of second sprocket teeth at a second contact point along the second engaging side tooth profile spaced from the first contact point.

14. The roller chain drive system of claim 13, wherein the first contact point is positioned radially outward of the second contact point.

15. The roller chain drive system of claim 13, wherein said second plurality of sprocket teeth including a second engaging side root radius, and an engaging side inclined root surface tangent to at least one of said first engaging side root radius and said second engaging side root radius to provide tooth space clearance.

16. The roller chain drive system of claim 15, wherein said first plurality of sprocket teeth further include a first disengaging side tooth profile having a first disengaging side root radius, said second plurality of sprocket teeth further include a second disengaging side tooth profile having a second disengaging side root radius, and a disengaging side inclined root surface tangent to at least one of said first disengaging side root radius and said second disengaging side root radius.

17. The roller chain drive system of claim 15, wherein said first engaging side root radius and said second engaging side root radius are both less that a roller radius.

18. The roller chain drive system of claim 13, wherein said first plurality of sprocket teeth include a first disengaging side tooth profile having a first disenqaging side root radius, said second plurality of sprocket teeth include a second disengaging side tooth profile having a second disengaging side root radius, and a disengaging side inclined root surface tangent to with at least one of said first disengaging side root radius and said second disengaging side root radius.

19. The roller chain drive system of claim 13, wherein the roller chain has a predetermined chain pitch and the at least one of said driving sprocket and said driven sprocket has a predetermined chordal pitch which is less than said chain pitch.

20. The roller chain drive system of claim 13, wherein an engaging flank pressure angle $\gamma$ of said first plurality of sprocket teeth is substantially the same as an engaging flank pressure angle $\gamma$ of said second plurality of sprocket teeth.

21. The roller chain drive system of claim 20, wherein a minimum engaging flank pressure angle ($\gamma_{min}$) of said first and said second plurality of sprocket teeth is greater than or equal to zero, and a maximum engaging flank pressure angle ($\gamma_{max}$) of said first and said second plurality of sprocket teeth is less than an ISO-606 minimum engaging flank pressure angle ($\gamma_{ISOmin}$).

22. The roller chain drive system of claim 13, wherein
a minimum engaging flank pressure angle ($\gamma_{min}$) of said first plurality of sprocket teeth is greater than or equal to zero, a minimum engaging flank pressure angle ($\gamma_{min}$) of said second plurality of sprocket teeth is greater than said minimum engaging flank pressure angle of said first plurality of sprocket teeth, and a maximum engaging flank pressure angle ($\gamma_{max}$) of said first and said second plurality of sprocket teeth is less than an ISO-606 minimum engaging flank pressure angle ($\gamma_{ISOmin}$).

23. The roller chain drive system of claim 13, wherein
a minimum engaging flank pressure angle ($\gamma_{min}$) of said first plurality of sprocket teeth is a negative value, a minimum engaging flank pressure angle ($\gamma_{min}$) of said second plurality of sprocket teeth is a positive value, and a maximum engaging flank pressure angle ($\gamma_{max}$) of said first and said second plurality of sprocket teeth is less than an ISO-606 minimum engaging flank pressure angle ($\gamma_{ISOmin}$).

24. The roller chain drive system of claim 13, wherein the asymmetrical tooth spaces of the driving and driven sprockets are defined by engaging side roller seating angles ($\beta$) that are greater than disengaging side roller seating angles ($\beta'$).

25. A sprocket comprising:
a first plurality of sprocket teeth each having a first engaging side tooth profile;
a second plurality of sprocket teeth each having a second engaging side tooth profile including a flank flat; and
the sprocket being adapted for staged meshing with an associated roller chain having a plurality of rollers wherein a first roller of the associated roller chain impacts one of the plurality of first sprocket teeth at a first contact point along the first engaging side tooth profile and wherein a second roller of the associated roller chain impacts one of the plurality of second sprocket teeth at a second contact point along the second engaging side tooth profile, the second contact point being spaced radially outward of the first contact point.

* * * * *